(12) United States Patent
Mühlfriedel et al.

(10) Patent No.: US 7,201,543 B2
(45) Date of Patent: Apr. 10, 2007

(54) TWIST DRILL AND METHOD FOR PRODUCING A TWIST DRILL WHICH METHOD INCLUDES FORMING A FLUTE OF A TWIST DRILL

(75) Inventors: Dieter Mühlfriedel, Ebermannstadt (DE); Bernhard Borschert, Bamberg (DE); Jürgen Schwägerl, Vohenstrauss (DE)

(73) Assignee: Kennametal Inc., Latrobe, PA (US)

( * ) Notice: Subject to any disclaimer, the term of this patent is extended or adjusted under 35 U.S.C. 154(b) by 584 days.

(21) Appl. No.: 10/307,224

(22) Filed: Nov. 29, 2002

(65) Prior Publication Data

US 2003/0175086 A1     Sep. 18, 2003

Related U.S. Application Data

(63) Continuation-in-part of application No. PCT/EP01/05751, filed on May 19, 2001.

(30) Foreign Application Priority Data

Jun. 2, 2000   (DE)  ................. 100 27 544

(51) Int. Cl.
  *B23B 51/02*    (2006.01)
(52) U.S. Cl. .............. 408/230; 408/227; 408/59
(58) Field of Classification Search ........ 408/230, 408/227, 59; *B23B 51/02*
  See application file for complete search history.

(56) References Cited

U.S. PATENT DOCUMENTS 5,088,863 A    2/1992   Imanaga et al.
5,230,593 A  * 7/1993   Imanaga et al. ............ 408/230
5,678,960 A  * 10/1997  Just et al. ................... 408/230
5,947,659 A  * 9/1999   Mays ......................... 408/211
6,315,504 B1 * 11/2001  Sekiguchi et al. .......... 408/144

FOREIGN PATENT DOCUMENTS

| DE | 2459286 | | 6/1976 |
| EP | 1184114 A2 | * | 3/2002 |
| JP | 55-90212 | * | 7/1980 |
| JP | 55-106710 | * | 8/1980 |
| JP | 2000-198011 A | * | 7/2000 |
| WO | 9700831 | | 3/1997 |

OTHER PUBLICATIONS

Müke, K., Fünfachsige Schleifprogramme automatisch generieren (Automatically Generate Five-Axis Grinding Programs), Werkstatt und Betrieb, 130 (1997), pp. 42-45.

* cited by examiner

*Primary Examiner*—Monica S. Carter
*Assistant Examiner*—J Williams
(74) *Attorney, Agent, or Firm*—Nils H. Ljungman & Associates

(57) ABSTRACT

A twist drill and method for producing is provided. The cutting edge structure has a first portion at the drill tip portion and a second portion disposed away from the drill tip portion. The flute wall extends further into the land structure at the second portion of the cutting edge structure than at the tip portion to provide a greater amount of drill material at the tip portion than at the second portion of the cutting edge structure. The flute wall extends further into the land structure at the second portion of the cutting edge structure than at the tip portion to provide a greater flute volume per length at the second portion of the cutting edge structure than at the drill tip portion.

16 Claims, 16 Drawing Sheets

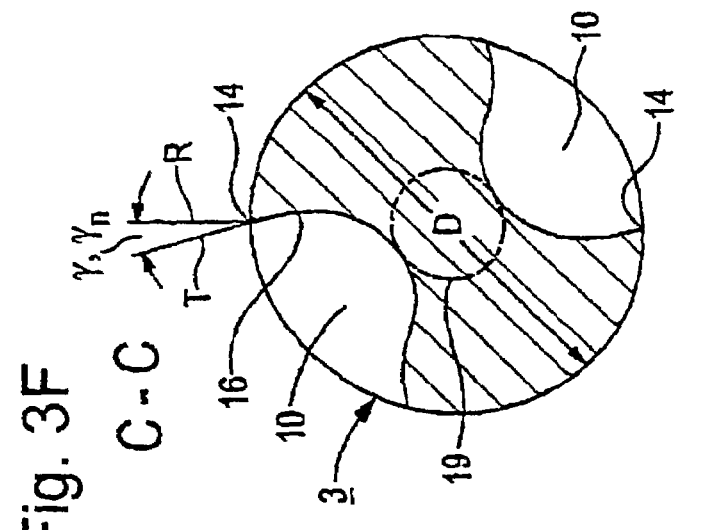
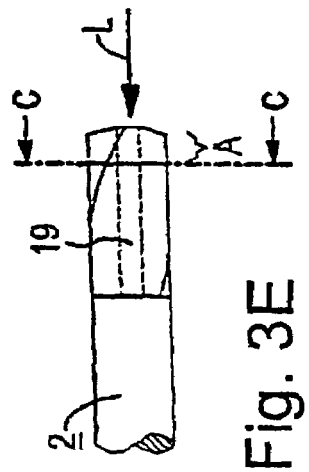
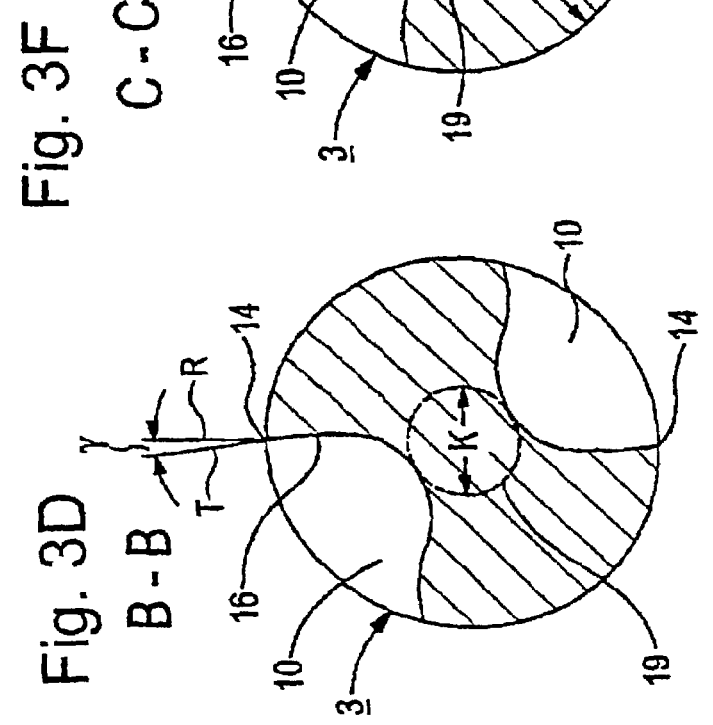
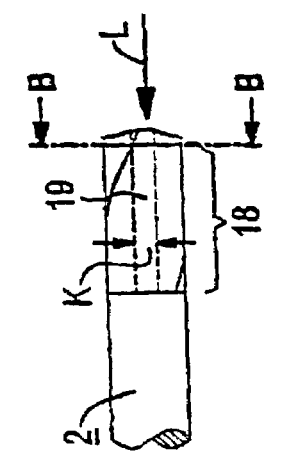
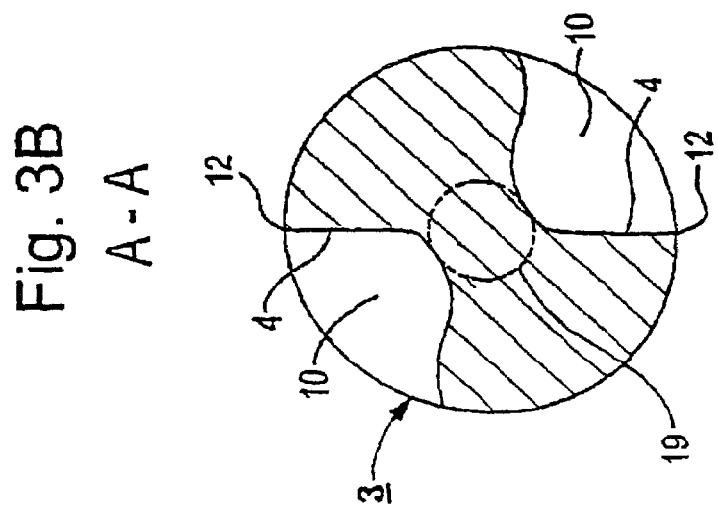
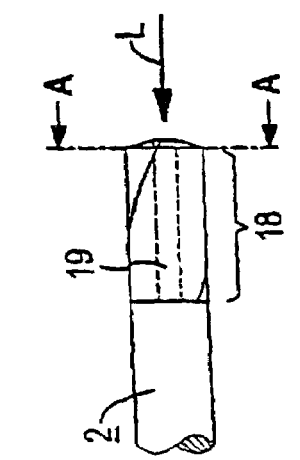

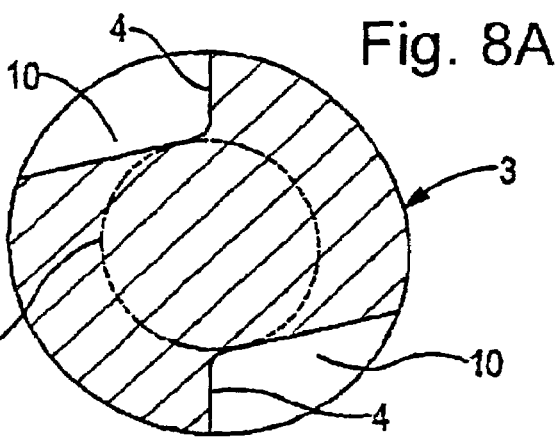
Fig. 8A
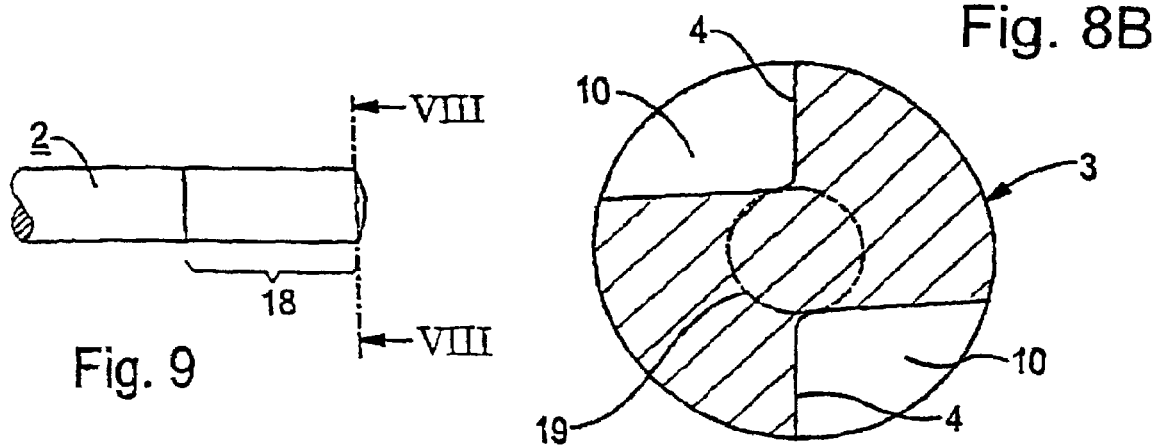
Fig. 8B
Fig. 9
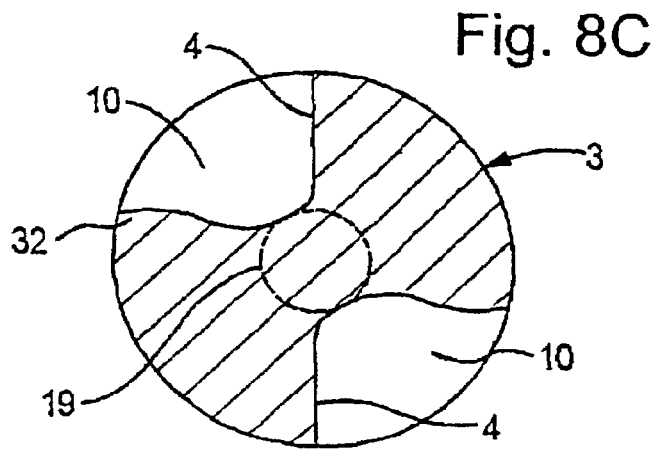
Fig. 8C

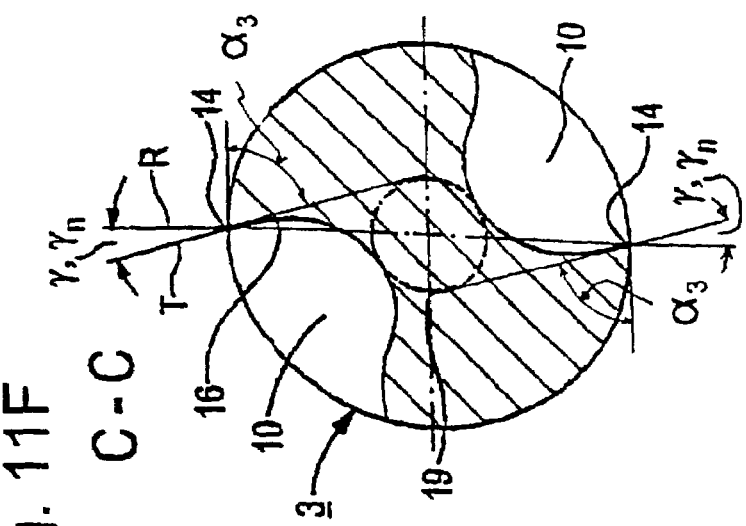
Fig. 11B A-A
Fig. 11A
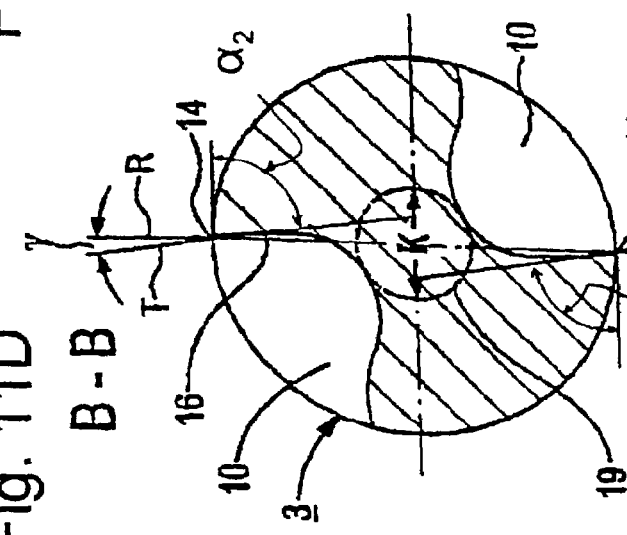
Fig. 11D B-B
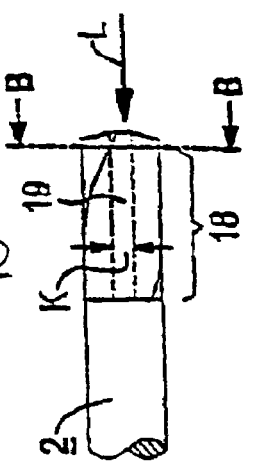
Fig. 11C
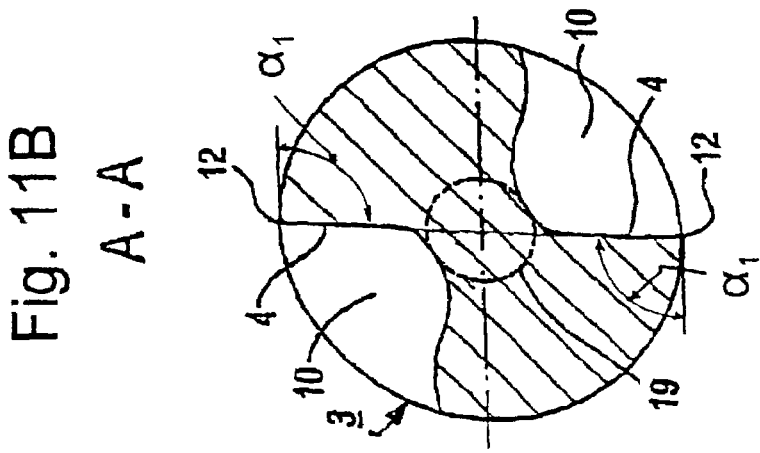
Fig. 11F C-C
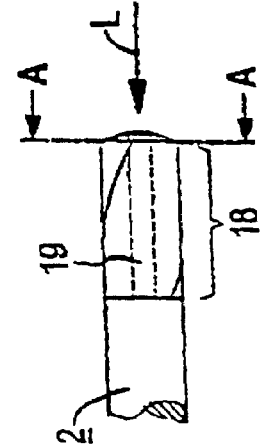
Fig. 11E

TWIST DRILL AND METHOD FOR PRODUCING A TWIST DRILL WHICH METHOD INCLUDES FORMING A FLUTE OF A TWIST DRILL

CONTINUING APPLICATION DATA

This application is a Continuation-in-Part application of International Application No. PCT/EP01/05751, filed on May 19, 2001, and claiming priority from German Patent Application No. DE 100 27 544.3, filed on Jun. 2, 2000. International Application No. PCT/EP01/05751 was pending as of the filing date of this application. The United States was an elected state in International Application No. PCT/EP01/05751.

BACKGROUND OF THE INVENTION

1. Field of the Invention

This invention relates to a twist drill and method for producing a twist drill which method includes forming a flute of a twist drill.

2. Background Information

On a conventional bit for a twist drill, the generally two main cutting edges are curved via the chisel edge so that they run into one another in the shape of an "S". Adjacent to each of the main cutting edges is a main clearance face which transitions into a flute which is realized so that it runs in a spiral shape in the longitudinal direction of the drill. The secondary cutting edge is formed on one of the peripheral sides of the respective flute and transitions into the main cutting edge, forming a face edge. The secondary cutting edge is therefore the cutting edge that extends in a spiral shape in the longitudinal direction of the drill along the respective flute. The term "bit" is used here to designate a longitudinal area of the drill which begins at the end-cutting edge (main cutting edge and chisel edge) and has a length which equals approximately twice the diameter of the drill.

The secondary cutting angle, as defined above, indicates appropriately the geometric orientation of a wedge that forms the secondary cutting edge with reference to the radial direction, i.e. the direction perpendicular to the longitudinal axis of the drill. The term "positive secondary cutting angle", i.e. a cutting angle of more than 0°, is therefore used when the wedge forms an acute angle. On conventional bits with the curved realization of the main cutting edges and the chisel edge, there is a positive secondary cutting angle. This secondary cutting angle extends with a constant value over the entire cutting length of the drill.

The positive secondary cutting angle has the advantage that the contact area between the chips removed from the workpiece during the drilling process and the wall of the boring in the workpiece is minimized. The chips are therefore discharged very rapidly. In the vicinity of the main cutting edges, however, the positive secondary cutting angle has the disadvantage that the cutting wedge is comparatively weak in the vicinity of the face edge on account of its acute-angle geometry. However, precisely in the vicinity of the face edge is where very high forces occur during drilling. The load is further increased by the fact that during drilling, the face edge digs into the material, so to speak. Thus at this point in particular there is a danger that the drill will break off. A further disadvantage is that the chip thrown off is curved, which requires an additional exertion of force and thus additional cutting efficiency.

To avoid these problems of the positive secondary cutting angle in the vicinity of the major cutting edges, one possibility is to provide a secondary cutting angle with a value of 0°. In this case, therefore, the main cutting edges run in a straight line toward the chisel edges. Consequently the cutting wedge is relatively massive in the vicinity of the cutting face and is therefore stable. The risk of an overload in this area is therefore kept low. A secondary cutting angle of 0°, however, has the significant disadvantage that the chip will not be removed from the boring wall quickly enough over the cutting length of the drill. Under some conditions, this leads to an undesirable surface roughness of the boring wall. For the realization of a secondary cutting angle of 0°, an expensive shaped grinding wheel with a complex geometry is required during the grinding of the drill. On the other hand, with a positive secondary cutting angle, a standard grinding wheel with a simple geometry can be used, which is relatively advantageous.

OBJECT OF THE INVENTION

The object of the invention is to reduce the above mentioned disadvantages.

SUMMARY OF THE INVENTION

The invention teaches in one embodiment that this object can be accomplished by a twist drill configured to drill a hole in a metal object, said twist drill comprising: a cylindrical drill body; said drill body having a central longitudinal axis of rotation about which said drill is configured to rotate during use; a shank portion; said shank portion being configured to be retained by an arrangement to rotate said drill to cut a hole in a metal object; a cutter portion; said cutter portion comprising a first portion being disposed immediately adjacent said shank portion and also comprising a second portion opposite said first portion of said cutter portion; a tip portion configured to drill a hole in a metal object to be drilled; said tip portion comprising: a base portion and a top portion; said base portion being disposed immediately adjacent said second portion of said cutter portion; an at least partially conical surface; a first chip face and a second chip face, each forming a portion of said at least partially conical surface of said tip portion; a second chip face forming a portion of said at least partially conical surface of said tip portion; a chisel edge arrangement configured to initiate cutting of an object to be drilled; said chisel edge arrangement being disposed between said first chip face and said second chip face; said chisel edge arrangement comprising: a first chisel edge portion and a second chisel edge portion; each of said chisel edge portions being disposed to extend away from each other from said central longitudinal axis; and said first chisel edge portion and said second chisel edge portion being symmetric with respect to one another about said central longitudinal axis; said tip portion also comprising: a first, primary, cutting lip, configured to drill a hole in a metal object, being disposed between said first chisel edge portion and said base portion of said tip portion; a second, primary, cutting lip, configured to drill a hole in a metal object, being disposed between said second chisel edge portion and said base portion of said tip portion; said first cutting lip and said second cutting lip being substantially symmetric with respect to one another about said central longitudinal axis; said cutter portion comprising: a first and a second helical land structure, each being configured and disposed to provide a first helical flute surface and a second helical flute surface, both flute surfaces being configured to remove chip residue produced by said drill upon drilling; said first helical land structure and said second helical land structure each comprising: a first, leading, flute wall configured and disposed to make cutting contact with a metal object to be drilled by said drill; a second, trailing, flute wall; the leading flute wall being configured to lead the trailing flute wall in the direction of rotation upon drilling of a metal object; and an at least partially cylindrical land surface that is disposed further away from said longitudinal axis of rotation than a substantial portion of its corresponding flute surface; the leading flute wall of said first helical land structure being joined to the trailing flute wall of said second helical land structure to configure said first helical flute surface; the leading flute wall of said second helical land structure being joined to the trailing flute wall of said first helical land structure to configure said second helical flute surface; each leading flute wall of said first helical land structure and said second helical land structure comprising corresponding first and second longitudinal cutting edge structures, each longitudinal cutting edge structure being disposed at least along a substantial portion of its corresponding leading flute wall of its corresponding helical land structure; each longitudinal cutting edge structure having a first portion disposed at or adjacent said base portion of said tip portion and also having a second portion disposed away from said tip portion of said drill; each leading flute wall of said first and second helical land structures having a first portion being disposed at or adjacent its corresponding longitudinal cutting edge structure, each said first portion of each leading flute wall being disposed at or adjacent said tip portion; and each at least partially cylindrical land surface having a first portion being disposed at or adjacent its corresponding longitudinal cutting edge structure, each said first portion of each land surface being disposed at or adjacent said tip portion; each said first portion of each leading flute wall and each adjacent corresponding first portion of each corresponding at least partially cylindrical land surface being disposed at a first angle with respect to one another; each leading flute wall of said first and second helical land structure having a second portion being disposed at or adjacent its corresponding longitudinal cutting edge structure, each said second portion of each leading flute wall being disposed at or adjacent its corresponding second portion of said longitudinal cutting edge structure; each at least partially cylindrical land surface having a second portion being disposed at or adjacent its corresponding longitudinal cutting edge structure, said second portion of said land surface being disposed at or adjacent its corresponding second portion of said longitudinal cutting edge structure; each said second portion of each leading flute wall and each adjacent corresponding second portion of each corresponding at least partially cylindrical land surface being disposed at a second angle with respect to one another; and said first angle being greater than said second angle; each leading flute wall being configured to extend further into its corresponding helical land structure at its corresponding second portion of its corresponding cutting edge structure than at said tip portion of said drill to provide a greater amount of drill material at said tip portion at or adjacent its corresponding cutting lip of said drill to minimize stress at said tip portion at or adjacent its corresponding cutting lip and to provide a greater flute volume of its corresponding helical flute per length along said longitudinal axis of rotation at its corresponding second portion that is disposed away from said tip portion than the flute volume of its corresponding helical flute per length along said longitudinal axis of rotation at said tip portion to maximize removal of chip residue in its corresponding flute upon drilling.

The invention also teaches in one embodiment that this object can be accomplished by a drill configured to drill a hole in an object, said drill comprising: a longitudinal axis of rotation about which said drill is configured to rotate during use; a first portion configured to be retained by an arrangement to rotate said drill to cut a hole in an object; a second portion; and a tip portion configured to drill a hole in an object to be drilled; said second portion being disposed between said first portion and said tip portion; said tip portion comprising: at least one cutting lip configured to drill a hole in an object; said second portion comprising at least one land structure; each said at least one land structure comprising: a first, leading, edge configured and disposed to make cutting contact with an object to be drilled by said drill upon drilling; a second, trailing, edge; said first, leading, edge being configured to lead said second, trailing edge in the direction of rotation upon drilling of an object; a first, leading, wall configured to form a first side of said at least one land structure; said leading wall being disposed from said leading cutting edge towards said longitudinal axis of rotation; a second, trailing, wall configured to form a second side of said at least one land structure; said trailing wall being disposed from said trailing edge towards said longitudinal axis of rotation; said leading wall and said trailing wall being configured to form a flute surface being disposed towards said longitudinal axis of rotation to remove chip residue produced during drilling; a land surface disposed between said leading cutting edge and said trailing edge of said at least one land structure; said land surface being disposed further away from said longitudinal axis of rotation than a substantial portion of said flute surface; said leading cutting edge of said at least one land structure comprising a cutting edge structure disposed longitudinally along a portion of said at least one land structure; said longitudinal cutting edge structure having a first portion disposed at said tip portion of said drill; said longitudinal cutting edge structure also having a second portion disposed away from said tip portion of said drill towards said first portion of said drill; a first portion of said leading wall of said at least one land structure being disposed at or adjacent said cutting edge structure, said first portion of said leading wall being disposed at or adjacent said tip portion; and a first portion of said land surface being disposed at or adjacent said cutting edge structure, said first portion of said land surface being disposed at or adjacent said tip portion; said first portion of said leading wall and said first portion of said land surface being disposed at a first angle with respect to one another; a second portion of said leading wall of said at least one land structure being disposed at or adjacent said cutting edge structure, said second portion of said leading wall being disposed at or adjacent said second portion of said cutting edge structure; a second portion of said land surface being disposed at or adjacent said cutting edge structure, said second portion of said land surface being disposed at or adjacent said second portion of said cutting edge structure; said second portion of said leading wall and said second portion of said land surface being disposed at a second angle with respect to one another; and said first angle being greater than said second angle.

The invention further teaches in one embodiment that the object can be accomplished by a method of manufacture of a drill configured to drill a hole in an object, said drill comprising: a drill material; a longitudinal axis of rotation about which said drill is configured to rotate during use; a tip portion comprising at least one cutting lip; and at least one land structure configured to form at least one flute to remove chip residue produced upon drilling; each said at least one land structure comprising at least one flute wall and a cutting edge structure; said cutting edge structure being disposed longitudinally along at least a portion of said at least one flute wall of said at least one land structure; said cutting edge structure comprising a first portion at or adjacent said tip portion and a second portion disposed away from said tip portion; and at least one of (a.) and (b.), wherein (a.) and (b.) are: (a.) said drill material comprising the same drill material from said tip portion to said second portion of said cutting edge structure disposed away from said tip portion; and said at least one flute wall being configured to extend further into at least one adjacent land structure at said second portion of said cutting edge structure than into at least one land structure at or adjacent said tip portion of said drill to provide a greater amount of said drill material at said tip portion; and (b.) said at least one flute wall being configured to extend further into at least one adjacent land structure at said second portion of said cutting edge structure than into at least one land structure at or adjacent said tip portion of said drill to provide a greater flute volume of said at least one flute per length along said longitudinal axis at said second portion of said cutting edge structure that is disposed away from said tip portion than the flute volume of said at least one flute per length along said longitudinal axis at said tip portion; said method comprising: forming said drill to make at least one of (c.) and (d.), wherein (c.) is: (c.) extending said at least one flute wall further into said at least one adjacent land structure at said second portion of said cutting edge structure than into said at least one land structure at or adjacent said tip portion of said drill to provide a greater amount of said drill material at said tip portion than at said second portion of said cutting edge structure; wherein said drill material comprises the same drill material from said tip portion to said second portion of said cutting edge structure disposed away from said tip portion; and wherein (d.) is: (d.) extending said at least one flute wall further into said at least one adjacent land structure at said second portion of said cutting edge structure than into said at least one land structure at or adjacent said tip portion of said drill to provide a greater flute volume of said at least one flute per length along said longitudinal axis at said second portion of said cutting edge structure that is disposed away from said tip portion than the flute volume of said at least one flute per length along said longitudinal axis at said tip portion.

The invention also teaches that this object can be accomplished by a drill configured to drill a hole in an object, said drill comprising: a drill material; a longitudinal axis of rotation about which said drill is configured to rotate during use; a tip portion comprising at least one cutting lip; and at least one land structure configured to form at least one flute to remove chip residue produced upon drilling; each said at least one land structure comprising at least one flute wall and a cutting edge structure; said cutting edge structure being disposed longitudinally along at least a portion of said at least one flute wall of said at least one land structure; said cutting edge structure comprising a first portion at or adjacent said tip portion and a second portion disposed away from said tip portion; and at least one of (a.) and (b.), wherein (a.) and (b.) are: (a.) said drill material comprising the same drill material from said tip portion to said second portion of said cutting edge structure disposed away from said tip portion; and said at least one flute wall being configured to extend further into at least one adjacent land structure at said second portion of said cutting edge structure than into at least one land structure at or adjacent said tip portion of said drill to provide a greater amount of said drill material at said tip portion than at said second portion of said cutting edge structure; and (b.) said at least one flute wall being configured to extend further into at least one adjacent land structure at said second portion of said cutting edge structure than into at least one land structure at or adjacent said tip portion of said drill to provide a greater flute volume of said at least one flute per length along said longitudinal axis at said second portion of said cutting edge structure that is disposed away from said tip portion than the flute volume of said at least one flute per length along said longitudinal axis at said tip portion.

The invention teaches in one embodiment a bit for a twist drill that has a plurality of main cutting edges that are connected with one another by a chisel edge, adjacent to which main cutting edges in the longitudinal direction of the drill are secondary cutting edges that run along flutes, whereby different secondary cutting angles are defined in the longitudinal direction of the drill.

The invention, in one aspect, is based on the consideration that different loads are exerted on different points of the cutting length of the drill, and that different secondary cutting angles, i.e. a variable profile of the secondary cutting angle in the longitudinal direction of the drill, are advantageous. Because the bit is realized with a variable secondary cutting angle in the longitudinal direction of the drill, it is therefore possible to provide a locally optimized secondary cutting angle for the respective local load.

The secondary cutting angle preferably increases in the longitudinal direction of the drill, and in particular it increases continuously. As a result of this configuration, the drill bit is relatively stable in the vicinity of the face edge on account of its low secondary cutting angle, and an increasingly larger positive secondary cutting angle is formed in the further course of the secondary cutting edge, which ensures a rapid chip flow.

Preferably, the secondary cutting angle on the main cutting edges is in the range between +5° and −5°. In particular, it is between 0° and −5°. As a result of this configuration with a zero secondary cutting angle or with a slightly negative secondary cutting angle, a high stability of the cutting wedge in the vicinity of the face edge is guaranteed. On the other hand, the face edge is prevented from locking as the drill bit is engaged in the material. The choice of the special secondary cutting angle is thereby a function of the material to be worked. Negative cutting angles, i.e. an obtuse secondary cutting edge, are used in special cases, e.g. for soft materials such as non-ferrous metals or plastics.

In one particularly appropriate realization, the main cutting edges run in a straight line toward the chisel edge. The secondary cutting angle is therefore 0° in the vicinity of the face edge. This configuration achieves particularly good cutting and high stability. The cutting face is thereby very rugged and strong. A drill bit of this type is preferably manufactured using a continuous grinding process. However, the drill bit can also be manufactured on a conventional drill bit with a positive secondary cutting angle and curved main cutting edges in the vicinity of the cutting face by grinding the main cutting edges in a straight line in a separate grinding step. However, this method has the disadvantage that undesirable transitions, i.e. edges, are generated in the vicinity of the cutting edges.

The cutting edges, in particular the secondary cutting edges of the drill, preferably do not have a protective bevel, i.e. they are not chamfered. Nevertheless, protective bevels can also be provided. In that case, the respective main cutting edges do not run in a straight line all the way to the secondary cutting edge, but only to the protective bevel.

To achieve a rapid chip removal from the wall of the boring over the further course of the cutting length of the drill, the secondary cutting angle preferably increases up to a relatively large final value of up to +25°.

Because the problem of the breakage of the cutting edge occurs only in the immediate vicinity of the main cutting edges, the final value is achieved as early as after a length in the longitudinal direction of the drill that equals 0.25 to 1.5 times and preferably one times the diameter of the drill.

Preferably the drill bit and in particular the entire twist drill has a drill core with a constant core diameter or a core diameter that decreases in the longitudinal direction of the drill. A twist drill with a constant core diameter is particularly easy to manufacture. The decreasing core diameter in the direction of the longitudinal axis of the drill has the advantage that the flutes thereby become deeper and thus more chip space is available. The result is a better chip flow, and stagnation of the chip flow is prevented. The core diameter is preferably tapered in a range between 10 and 20%, with reference to a length of approximately 100 mm.

The invention, in one aspect, further teaches a method for the manufacture of a flute in the vicinity of such a drill bit for a twist drill, whereby different secondary cutting angles are generated in the longitudinal direction of the drill. In particular, the values of these secondary cutting angles increase continuously in the longitudinal direction of the drill.

With a method of this type, a drill is obtained that is particularly rugged in the vicinity of the main cutting edges, and it can simultaneously be guaranteed that during drilling, there will be a fast chip flow in the vicinity of the secondary cutting edges, and a drill hole with a good surface quality is obtained.

To simplify the manufacturing process and make it more economical, the different secondary cutting angles are thereby generated in one continuous grinding process.

For this purpose, during the grinding process, a grinding wheel and the drill bit are preferably guided with respect to each other in a multi-dimensional movement in three-dimensional space. A multi-dimensional movement in three-dimensional space can be performed using CNC machine tools that are currently in wide use. The grinding wheel and the drill bit thereby execute relative complex movements in relation to each other.

During the grinding process, a grinding wheel is preferably used that is realized in the form of a standard grinding wheel that can be used for several types of drills. The term "drill types" is hereby used to designate twist drills, which can have different secondary cutting edge angles, for example. A standard grinding wheel of this type can be used, for example, to manufacture a conventional twist drill that has a positive secondary cutting angle that is constant over the cutting length, and in which the main cutting edges are curved in the shape of an "S" over the chisel edge.

As an alternative to grinding to generate the different secondary cutting edges, these edges can also advantageously be manufactured using an injection molding process. The advantage of such an injection molding process is that even complex geometries of the drill bit can be manufactured rapidly and easily. The complexity of the geometry is limited only by the limitations of injection molding technology, and by limitations in the construction of the mold for the drill bit.

A drill bit that is manufactured in this manner can be realized, for example, in the form of a separate drill bit part which can be inserted in the form of a replaceable part in an appropriately configured drill base, at least some of which is comprised by the secondary cutting edges. The drill bit can alternatively be realized in the form of an integral component of a twist drill, i.e. in one piece with it. In the one-piece realization, immediately after the grinding of the flute in the area of the drill bit, the complete flute is quickly and easily ground over the entire cutting length, or the entire drill is injection-molded.

One exemplary embodiment of the invention is explained in detail below and is illustrated in the accompanying schematic diagrams.

The above-discussed embodiments of the present invention will be described further hereinbelow. When the word "invention" is used in this specification, the word "invention" includes "inventions", that is the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments which are illustrated in the accompanying drawings.

FIGS. 3A and 3B are an elevation to illustrate the forward portion of a twist drill with section line A—A and the corresponding cross section of FIG. 3B;

FIGS. 3C and 3D are an elevation to illustrate the forward portion of a twist drill with section line B—B and the corresponding cross section of FIG. 3D;

FIGS. 3E and 3F are an elevation to illustrate the forward portion of a twist drill with section line C—C and the corresponding cross section of FIG. 3F;

FIGS. 8A, 8B, 8C are schematic sectional views through a drill bit with a constant drill length at different times during the grinding process;

FIG. 9 is a side view of a drill with an indication of the sectional positions shown in FIGS. 8A–8C;

FIGS. 11A–11F are views similar to FIGS. 3A–3F and identifying further details;

DESCRIPTION OF THE PREFERRED EMBODIMENTS

In the figures, identical parts or parts that have an equivalent effect are identified by the same reference numbers.

Figure 1:
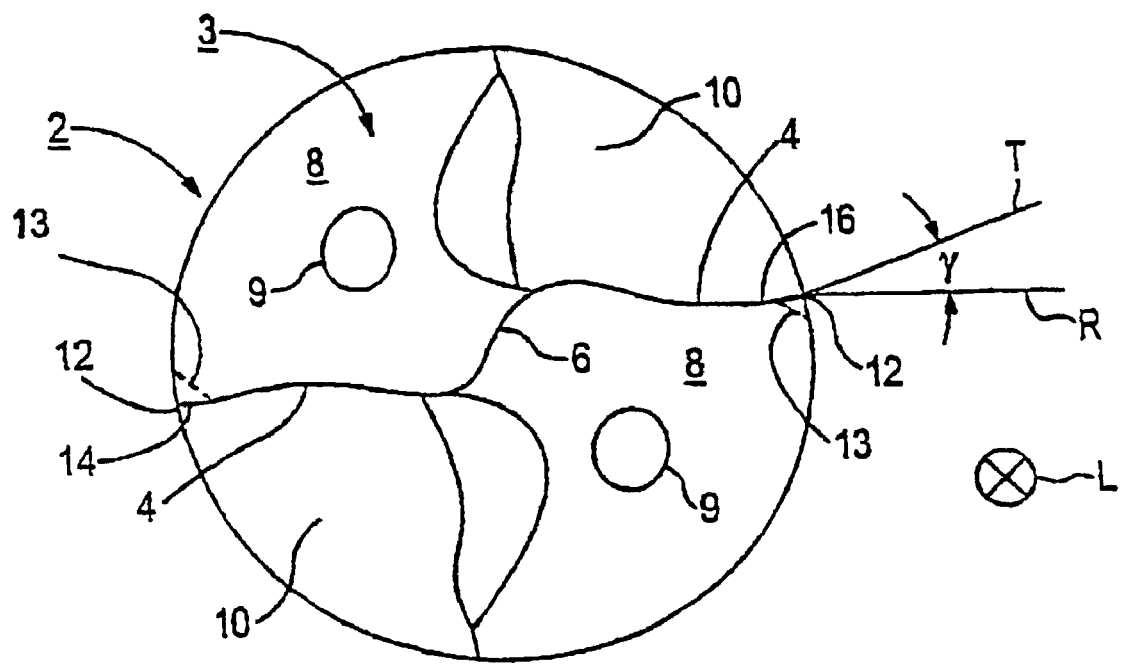
FIG. 1 is a plan view from overhead of the bit of a conventional drill with curved main cutting edges.

A conventional twist drill 2 illustrated in FIG. 1 and called a drill for short, has on the face end of its drill bit 3 two main cutting edges 4 which are connected to each other by a chisel edge 6. The main cutting edges 4 and the chisel edge 6 are curved in approximately the shape of an "S". Adjacent to each of the two main cutting edges 4 is a main clearance face or surface 8, each of which transitions into a flute 10.

The two main cutting edges or lips 4 run in approximately the radial direction of the drill 2. The main clearance faces 8 each have coolant boring 9, by means of which the drill 2 can be cooled during the drilling process. Adjacent to each of the main cutting edges 4 on the end-side, thereby forming a face edge 12, is a secondary cutting edge 14, which run in the longitudinal direction L of the drill, i.e. into the plane of the paper. The longitudinal direction L of the drill is illustrated in FIG. 1 by a cross in a circle.

As a result of the curved configuration of the main cutting edges 4, a positive secondary cutting angle $\gamma$ is formed in the vicinity of the face edge 12. This secondary cutting angle is defined by the angle between a tangent T which is tangent to the inside 16 of the secondary cutting edge 14 and the radial direction R. Both the tangent T as well as the radial direction R run perpendicular to the longitudinal direction L of the drill and therefore lie in a common plane. The definition of the secondary cutting angle $\gamma$ is best seen in FIG. 3D. The sectional plane, along line B—B, perpendicular to the longitudinal direction of the drill illustrated in FIG. 3C is simultaneously the common plane for the tangent T and the radial direction R.

The secondary cutting angle $\gamma$ is called positive if—as is the case in FIG. 1—the face edge 12 forms an acute angle, i.e. if the face edge 12 in particular projects beyond the center of the drill. On the other hand, the secondary cutting angle $\gamma$ is negative if an obtuse face edge 12 is formed. Along the secondary cutting edges 14 a protective bevel 13 can be provided, which is realized in the form of a bevel that is illustrated in broken lines in FIGS. 2 and 12.

Because in the conventional drill 2 illustrated in FIG. 1, the face edge 12 projects beyond the center of the drill, only a limited load can be applied to the face edge 12, because it is relatively thin. On account of the spiral-shaped flute 10, the face edge 12 forms an overhang both in the radial direction R and in the longitudinal direction L of the drill. The face edge 12 is the point with which the drill 2 is engaged with its end face in the workpiece being processed, which means that very high loads occur at that point.

The positive secondary cutting angle $\gamma$ illustrated in FIG. 1 in the conventional drill 2 runs constant over the entire secondary cutting edge 14. Consequently, the flute has a convex shape which ensures that the chips removed are very quickly removed from the wall of the boring in the workpiece that is being drilled. The curvature of the flute 10 adjacent to the secondary cutting edge 14 also means that the chips form a radius of curvature which is essentially determined by the radius of curvature of the flute 10.

Figure 2:
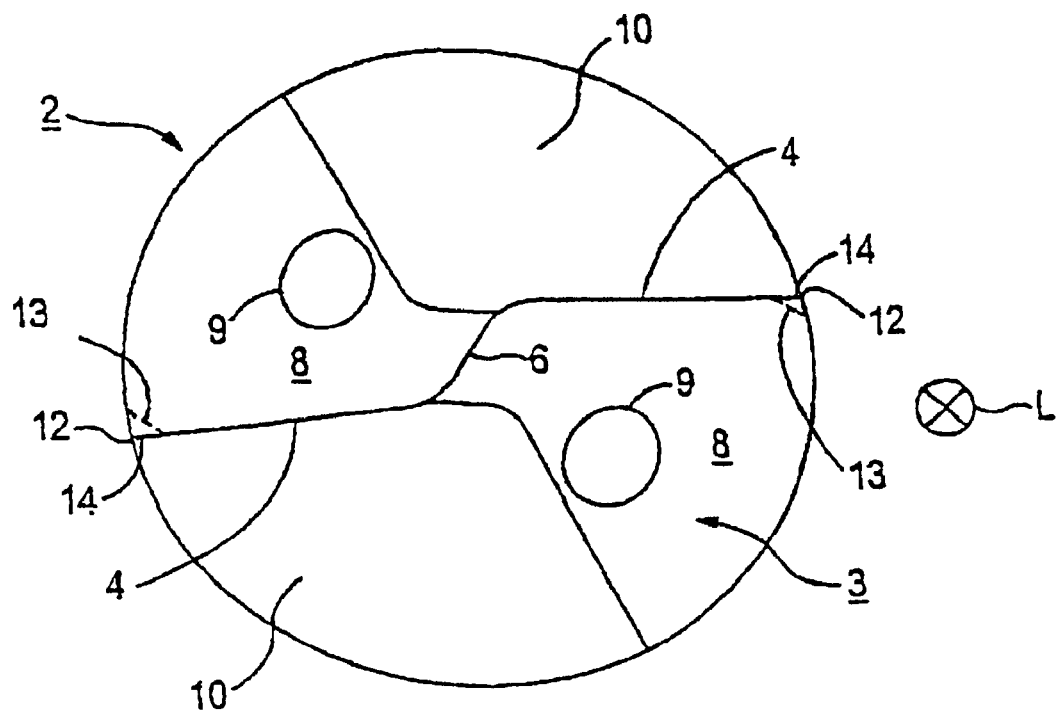
FIG. 2 is a plan view from overhead of a drill bit in accordance with one embodiment of the invention with main cutting edges that run in a straight line.

In contrast to the drill bit 3 illustrated in FIG. 1, the drill bit 3 illustrated in FIG. 2 has main cutting edges 4 which each run in a straight line and extend essentially radially toward the chisel edge 6. The secondary cutting angle $\gamma$. in this case is accordingly 0° with the main cutting edges 4. Therefore the face edge 12 is essentially more stable, which means that higher forces can be absorbed without the risk of breakage. To simultaneously achieve the positive effect of a positive secondary cutting angle $\gamma$ in the further course of the secondary cutting edges 14 in the longitudinal direction L of the drill, the secondary cutting angle $\gamma$ increases, in particularly continuously, in the longitudinal direction L of the drill.

The continuous increase of the secondary cutting angle $\gamma$ in the longitudinal direction L of the drill is most clearly illustrated in FIGS. 3A to 3F. These figures each indicate two views, whereby the upper views, FIGS. 3B, 3D, 3F, show a cross section through the bit 3 and the lower views, FIGS. 3A, 3C, 3E, show the position of the cross section with reference to the longitudinal direction L of the drill. For this purpose, a side view shows a drill 2 which has a cutting area 18 in its forward area. The position of the cross sections is indicated by a perpendicular line. FIG. 3B shows a section A—A immediately adjacent to the main cutting edges 4, i.e. in the immediate vicinity of the face edge 12. FIG. 3D shows a section B—B through the drill 2 a short distance behind the face edge 12, and FIGS. 3E shows a section C—C through the drill at a length A, at which the secondary cutting angle $\gamma$ has already possibly reached a final angle $\gamma_n$. In each of the figures, the drill core 19 is illustrated in dotted lines. The drill core has a constant core diameter K over the longitudinal direction L of the drill. This core diameter can alternatively also be tapered starting at the drill bit 3 in the longitudinal direction L of the drill.

As shown in FIG. 3B, the main cutting edges 4 initially run in a straight line, i.e. radially toward the center of the drill. The secondary cutting angle $\gamma$ therefore assumes a value of 0°.

As shown in FIGS. 3D and 3F, the value of the secondary cutting angle $\gamma$ increases continuously, so that the flute 10 becomes increasingly convex, so that the secondary cutting edge 14 is undercut by the flute 10. The flute 10 is therefore concavely curved toward the secondary cutting edge 14.

The final value $\gamma_n$ of the secondary cutting angle $\gamma$ is preferably approximately 25° and is reached at the length A which corresponds to 0.25 to 1.5 times the drill diameter D. The final value $\gamma_n$ is preferably achieved at one times the drill diameter D. Similar aspects of the drill 2 are discussed with reference to FIGS. 10 and 11A–11F further herein below.

Figure 4:
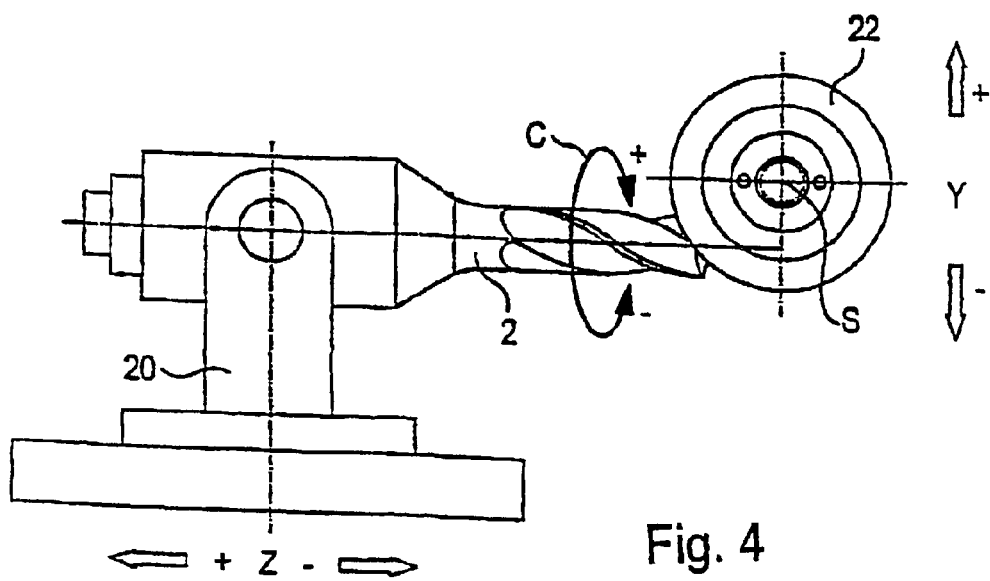
FIG. 4 is a side view of a drill in a collet relative to a grinding wheel to illustrate the grinding process in accordance with one embodiment of the present invention.
Figure 5:
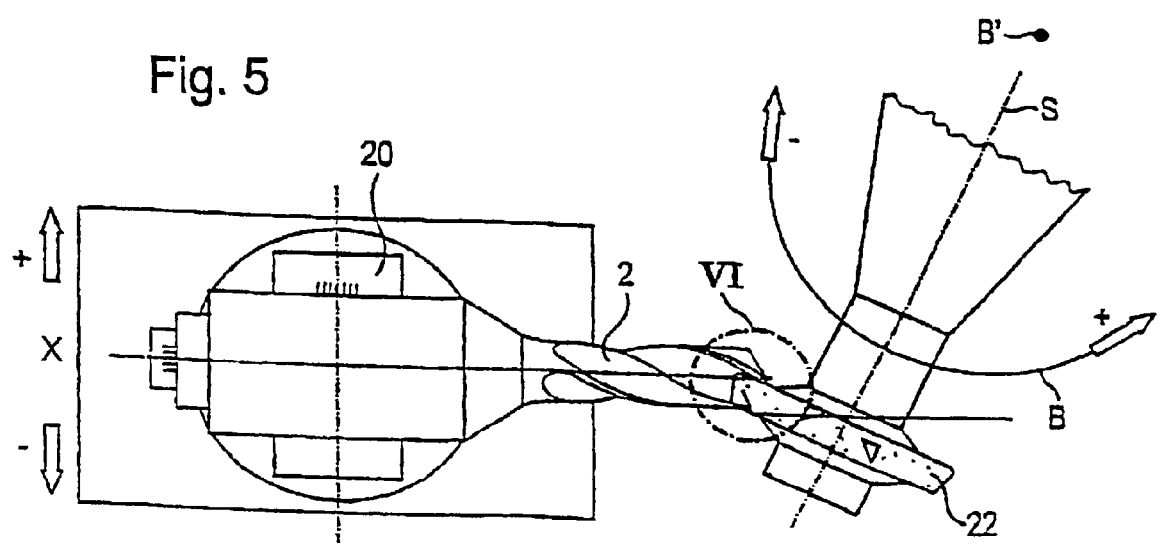
FIG. 5 is a plan view from overhead of the arrangement illustrated in FIG. 4.

With reference to FIGS. 4 to 7, the following portion of the description relates to a grinding method for the manufacture of a drill bit 3 with an increasing secondary cutting angle $\gamma$. As shown in FIGS. 4 and 5, the drill 2, or its corresponding drill blank 202, is chucked in a collet 20, in particular of a CNC machine tool. The collet 20 can be moved along a downfeed axis Z. The collet 20 can also be moved laterally along a lateral axis X. The drill 2 can also be rotated around an axis of rotation C which runs in the direction of the longitudinal axis L of the drill. For grinding, the drill 2 is brought up against a grinding wheel 22 that is realized in the form of a standard grinding wheel and which can rotate around an axis of rotation S. The grinding wheel 22 can be moved in a lateral direction of movement γ toward and away from the axis of rotation C of the drill 2. The direction of movement γ is accordingly oriented perpendicular to the axis of rotation S, which is in turn oriented perpendicular to the axis of rotation C of the drill 2. The grinding wheel 22 can also be pivoted around a pivoting axis B, as shown in FIG. 5. The different directions of movement of the individual axes B, C, X, Y, Z are each indicated by a + or a −.

Figure 6:
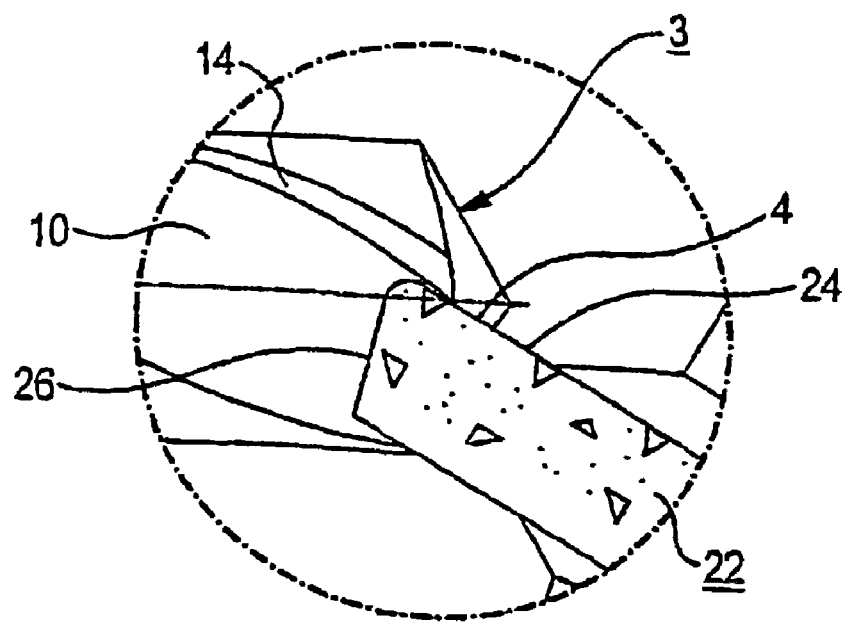
FIG. 6 is an enlarged illustration of the spot at the circle marked VI in FIG. 5 in the vicinity of the contact between the grinding wheel and the drill bit.
Figure 7:
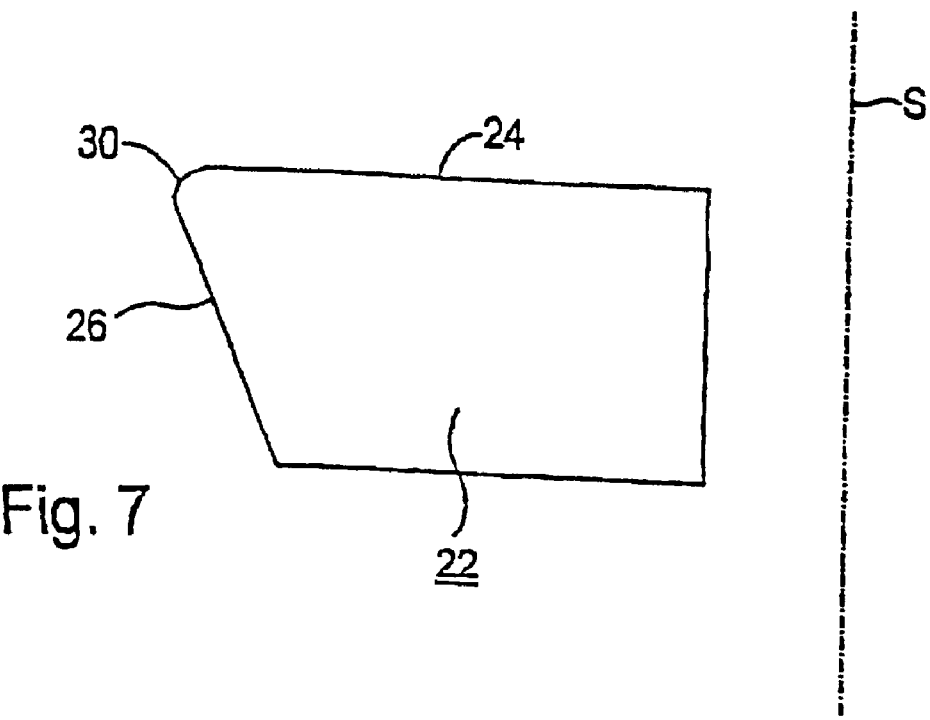
FIG. 7 is an exemplary sectional view of a standard grinding wheel.

The larger-scale illustration in FIG. 6 in the vicinity of the drill bit 3 shows that at the beginning of the grinding process, the main cutting edge 4 is processed with the lateral surface 24 of the grinding wheel 22, as a result of which a main cutting edge 4 that runs in a straight line is formed. The end face 26 of the grinding wheel 22 runs diagonally and transitions into the lateral surface 24 forming a curvature 30. The radius of curvature of the flute 10 is essentially determined by the curvature 30 of the grinding wheel 22. FIG. 7 shows a typical geometry of the grinding wheel 22 realized in the form of a standard grinding wheel in an enlarged sectional view. The figure shows only the left cross section side with reference to the axis of rotation S of the grinding wheel 22. The grinding wheel 22 has an essentially trapezoidal cross section surface, whereby the upper side of the two parallel sides of the trapezoid forms the lateral surface 24, which transitions into the end surface 26 and forms the curvature 30. A grinding wheel 22 of this type is generally used for grinding a drill 2 of the type described with reference to FIG. 1.

To obtain the desired different secondary cutting angles γ with a grinding wheel 22 of the type described above, a multi-dimensional relative movement is necessary in the space between the grinding wheel 22 and the drill 2.

To grind the drill 2, the collet 20 is moved along the downfeed axis Z throughout the grinding process. At the beginning of the grinding process, there is either no rotation or only a slight rotation around the axis of rotation C. The axis of rotation C corresponds to the longitudinal axis of the drill 2. First the grinding wheel 22 is moved continuously in the positive Y direction, whereby simultaneously the collet 20 is also moved in a positive direction along the X lateral axis. Superimposed on these directions of movement is a pivoting movement of the grinding wheel 22 around the pivoting axis B around the center of motion B', and specifically in the negative direction of the pivoting axis B.

In a grinding process of this type, the main cutting edge 4 is first ground with the lateral surface 24 of the grinding wheel 22, so that the main cutting edge 4 runs in a straight line. To realize the positive cutting angle, the grinding wheel 22 is then pivoted toward the drill 2 so that the curved end face 26 of the grinding wheel then realizes on the secondary cutting edge 6 (or 14) the radius of curvature of the flute 10, as illustrated in FIGS. 3E and 3F.

The progress of the grinding process in the area directly on the main cutting edges 4 at different times during the grinding is illustrated in FIGS. 8A to 8C. FIGS. 8A to 8C each illustrate a section VIII—VIII through the drill bit 3 (See FIG. 9). The main cutting edges 4 therefore run in a straight line in these three figures. As the grinding process proceeds, the geometry of the flute 10 changes significantly. At the beginning of the grinding process, the drill bit 3 is realized as illustrated in FIG. 8. The geometry of the flute 10 here corresponds essentially to the geometry of the cross section surface of the grinding wheel 22 as illustrated in FIG. 7. As the grinding process proceeds, the grinding wheel 22 is increasingly moved toward the center of the drill, as shown in FIG. 8B. Then, as a result of the pivoting movement of the grinding wheel 22 around the pivoting axis B, the peripheral area 32 of the flute 10 opposite the main cutting edge 4 is realized in a curved shape.

Figure 10:
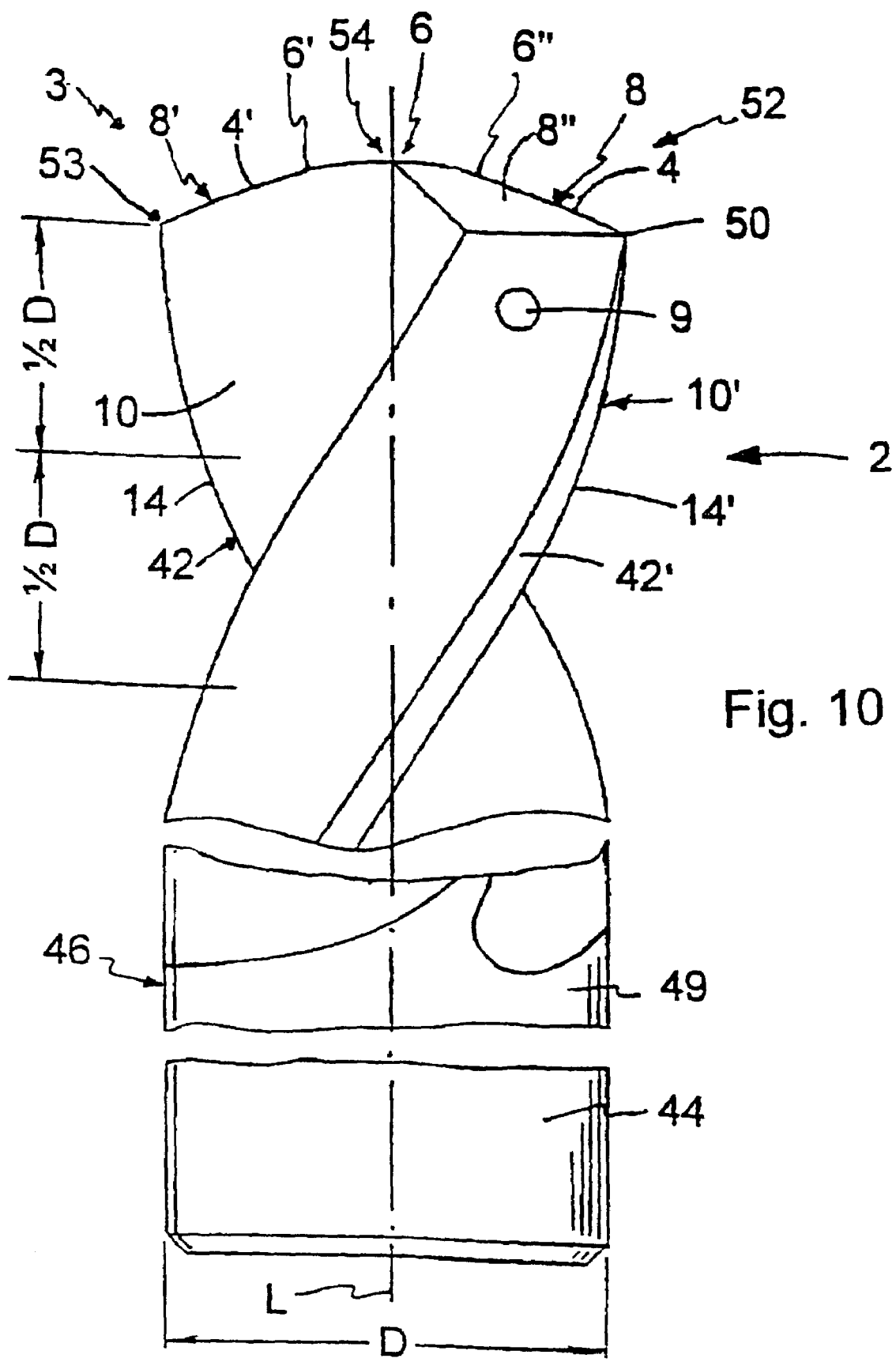
FIG. 10 is an elevational view to illustrate the configuration of a twist drill.

A twist drill 2 configured to drill a hole in a metal or other object is illustrated in portions in FIG. 10. The twist drill 2 may have a cylindrical drill body 46 and a longitudinal axis of rotation L about which the drill 2 is configured to rotate during use. The twist drill 2 has a shank portion 44 configured to be retained by an arrangement (not shown but known in the art) to rotate the twist drill 2 to cut a hole in a metal or other object to be drilled.

The twist drill 2 has a cutter portion 48 that has a first portion 49 which possibly may be disposed immediately adjacent the shank portion 44, or further away therefrom, and a second portion 50 opposite the first portion 49 of the cutter portion 48. A tip portion 52 is provided at the forward end of twist drill 2 and this tip portion 52 is configured to drill a hole in a metal or other object to be drilled. The tip portion 52 may be substantially cone-shaped and has a base portion 53 and a top portion 54 that forms the apex of twist drill 2. The base portion 53 is disposed immediately adjacent of the second portion 50 of the cutter portion 48, i.e., may coincide with the second portion 50. The tip portion 52 has an at least partially conical surface 8 with a first chip face 8' forming a portion of the at least partially conical surface 8 of the tip portion 52, and a second chip face 8" forming a portion of the at least partially conical surface 8 of the tip portion 52.

A chisel edge arrangement 6 that is configured to initiate cutting of an object to be drilled is disposed at the tip portion or apex 52 of twist drill 2. Chisel edge arrangement 6 is disposed between the first chip face 8' and the second chip face 8". The chisel edge arrangement 6 has a first chisel edge portion 6' and a second chisel edge portion 6" (see FIG. 12). The chisel edge portions 6' and 6" may be disposed to extend away from each other from the central longitudinal axis L. The first chisel edge portion 6' and the second chisel edge portion 6" may be disposed symmetrically with respect to one another about the central longitudinal axis L.

The tip portion 52 of twist drill 2 also has a first, or primary, cutting lip or edge 4 configured to drill a hole in a metal or other object, and this cutting lip or edge 4 may be disposed between the first chisel edge portion 6' and the base portion 53 of tip portion 52. A second, or primary, cutting lip or edge 4', that is configured to drill a hole in a metal or other object, is disposed between the second chisel edge portion 6" and the base portion 53 of tip portion 52. The first cutting lip 4 and the second cutting lip 4' may be substantially symmetric with respect to one another about the central longitudinal axis L. Cutting edge structures 14 and 14' extend in the longitudinal direction L along land structures 42 and 42'. Drill 2 has flutes 10 and 10'.

FIGS. 11A–11F show the views of FIGS. 3A–3F with the angles α and γ as will be explained further below.

Figure 12:
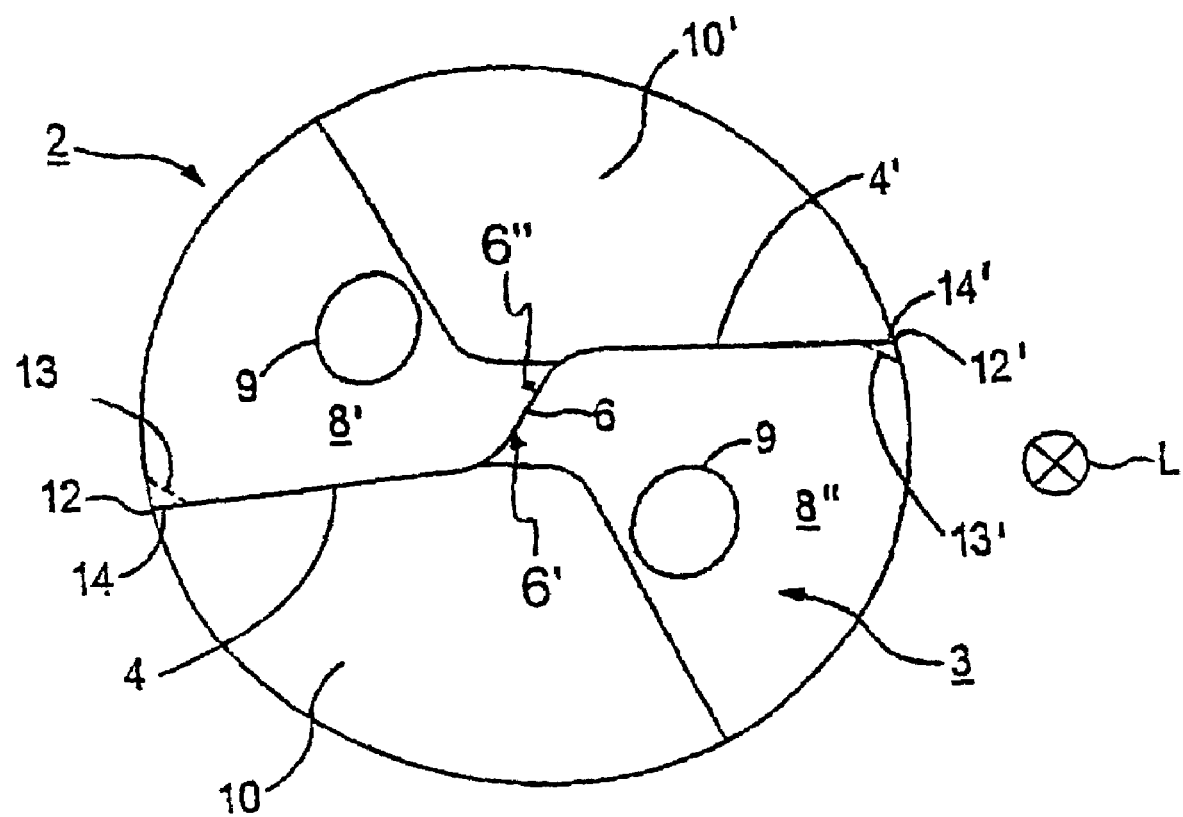
FIG. 12 is a plan view from overhead similar to FIG. 2 and identifying additional details.

FIG. 12 is a view similar to FIG. 2 and identifying details of chisel edge arrangement 6, namely, first chisel edge portion 6' and second chisel edge portion 6".

Figure 13:
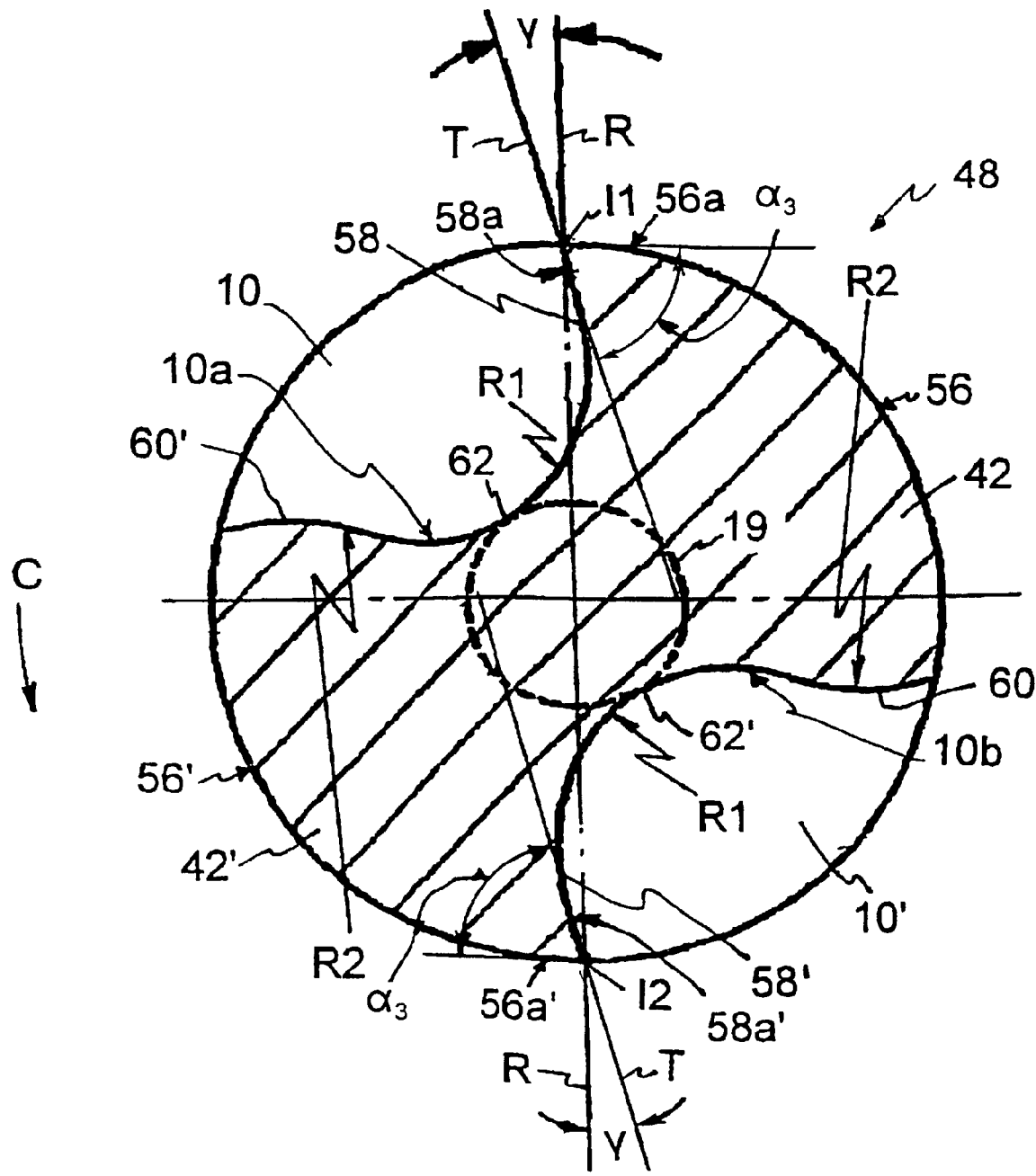
FIG. 13 is a cross section similar to FIG. 3F but shown in a larger scale than FIG. 3F and identifying further details.

With reference to FIG. 13, the cutter portion 48 also has a first helical land structure 42 and a second helical land structure 42', with the first 42 and second 42' helical land structures being configured and disposed to provide a first helical flute 10 and a second helical flute 10', both flutes 10 and 10' being configured to remove chip residue produced by drill 2 upon drilling.

The first helical land structure 42 and the second helical land structure 42' each have a first, leading, flute wall, respectively designated 58 and 58'. The leading flute walls 58 and 58' are configured and disposed to make cutting contact with a metal or other object to be drilled by drill 2.

The first helical land structure 42 and the second helical land structure 42' each also have a second, trailing, flute wall, respectively designated 60 and 60'. The leading flute walls 58 and 58' are respectively configured to lead the corresponding trailing flute walls 60 and 60' in the direction of rotation "C" upon drilling of a metal or other object.

The first helical land structure 42 and the second helical land structure 42' each also have an at least partially cylindrical land surface, respectively 56 and 56', that are disposed further away from the longitudinal axis of rotation L than a substantial portion of the corresponding flute surfaces 10a and 10b.

The leading flute wall 58 of the first helical land structure 42 is joined to the trailing flute wall 60' of the second helical land structure 42 to configure the first helical flute surface 10a of helical flute 10. This may be accomplished by suitable curvatures or other embodiments, for example, by radii R1 and R2.

In turn, the leading flute wall 58' of the second helical land structure 42' is joined to the trailing flute wall 60 of the first helical land structure 42 to configure the second helical flute surface 10b of helical flute 10'. This may be accomplished by suitable curvatures or other embodiments, for example, by radii R1 and R2.

The leading flute wall 58 of the first helical land structure 42 and the leading flute wall 58' of the second helical land structure 42' respectively have a longitudinal cutting edge structure, 14 and 14' (shown in FIG. 10), which are disposed at least along a substantial portion of the leading flute wall 58 of first helical land structure 42 and along a substantial portion of leading flute wall 58' of second helical land structure 42'.

Each longitudinal cutting edge structure 14, 14' has a corresponding first portion disposed at or adjacent the base portion 53 of the tip portion 52. Each longitudinal cutting edge structure 14, 14' has a second portion disposed away from the tip portion 52 of drill 2, for example, a distance equal to the diameter D of drill 2 (FIG. 10).

Each leading flute wall 58, 58' and its corresponding at least partially cylindrical land surface 56, 56', particularly portions 58a and 56a, intersect to form a first angle $\alpha_1$ (see FIG. 11B) at or adjacent the base portion 53 of tip portion 52. Each leading flute wall 58, 58' and its corresponding at least partially cylindrical surface 56, 56', particularly portions 58a' and 56a', intersect to form a second angle $\alpha_3$ (FIGS. 11F and 13) at the corresponding second portion disposed away from tip portion 52 of drill 2, say a distance equal to diameter D of drill 2. It will be appreciated that the cutting edge structures 14, 14' have angles between the first angle $\alpha_1$ and the second angle $\alpha_3$. One such angle is indicated in FIG. 11D as angle $\alpha_2$.

A contemplation of FIGS. 3B, 3D, and 3F as well as FIGS. 11B, 11D, and 11F and 13 will reveal that the leading flute walls recede further into the corresponding land structures 42 and 42', from tip portion 52 to the second portion 49. The deepest extend is illustrated in FIG. 13, wherein each leading flute wall 58, 58' is configured to recede or extend further into its corresponding helical land structure 42, 42' at the corresponding second portion of its corresponding cutting edge structure 14, 14' than at the tip portion 52 of drill 2. This serves to provide a greater amount of drill material at intersection 11 at the tip portion 52 at or adjacent its corresponding cutting lip 4, 4' of the drill 2 so as to minimize stress at the tip portion 52 at or adjacent its corresponding cutting lip 4, 4' and to provide a greater flute volume of its corresponding helical flute 10, 10' per length along the longitudinal axis of rotation L at its corresponding second portion that is disposed away, say by a distance equal to diameter D (FIG. 10), from the tip portion 52 than the flute volume of its corresponding helical flute 10, 10' per length along the longitudinal axis of rotation L at the tip portion 52, so as to maximize removal of chip residue in its corresponding flute 10, 10' upon drilling.

It will be appreciated that the second portion of each longitudinal cutting edge structure 14, 14' is disposed a substantial distance from the first portion of each longitudinal cutting edge structure 14, 14' which first portion is disposed at the tip portion 52.

The angles, such as $\alpha_2$, in FIG. 11D, between the first angle $\alpha_1$ and the second angle $\alpha_3$ form an angular transition which is preferably continuous.

The first angle $\alpha_1$, FIG. 11B, is disposed adjacent its corresponding cutting lip or edge 4, 4' and may be an angle within the range between approximately 95° and approximately 85°.

Each cutting lip 4, 4' has a straight portion, compare FIGS. 3B and 11B, that extends toward the chisel edge portion 6.

The second angle $\alpha_3$, FIGS. 11F and 13, may be an angle within the range between approximately 90° to approximately 65°.

Drill 2 has a diameter D. The second angle $\alpha_3$ may be disposed at a distance away from tip portion 52, in the direction of the longitudinal axis of rotation L, equal to about 0.25 to 1.5 times the magnitude of the drill diameter D.

FIG. 13 illustrates a core 19, along the longitudinal axis L of drill 2, from which core the first and second helical land structures 42, 42' extend. The core 19 may be defined by the first and second helical flute surfaces 10a and 10b, each having a portion 62, 62' that is disposed closer to the longitudinal axis than other portions of each of first and second helical flute surfaces 10a and 10b. Such closer portions 62, 62' being disposed a first distance from the longitudinal axis L, the first distance defining a radius and thus a core diameter K of the core 19.

Figure 14A:
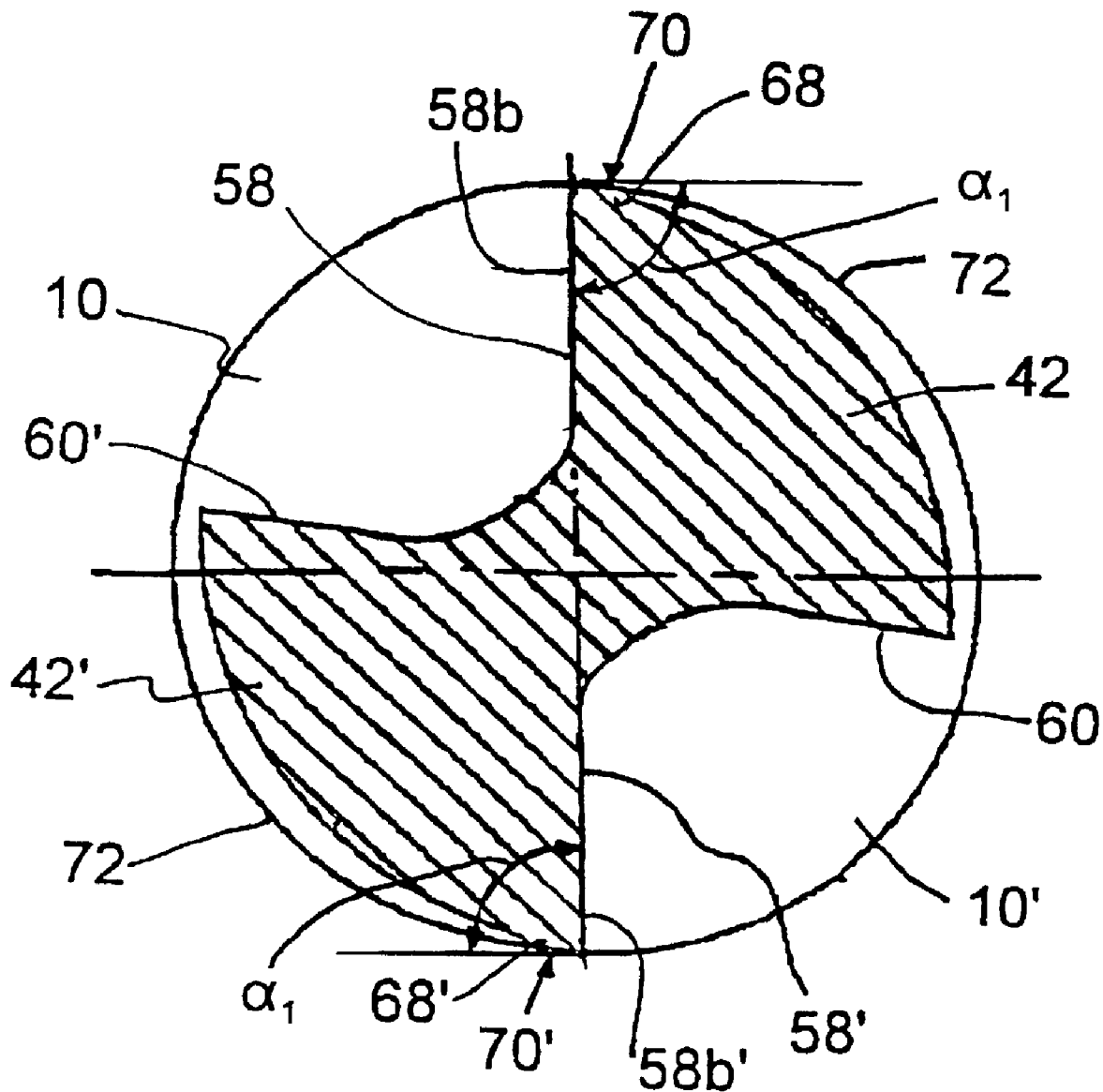
FIGS. 14A and 14B are cross sections similar to FIG. 12 of another embodiment of the present invention.
Figure 14B:
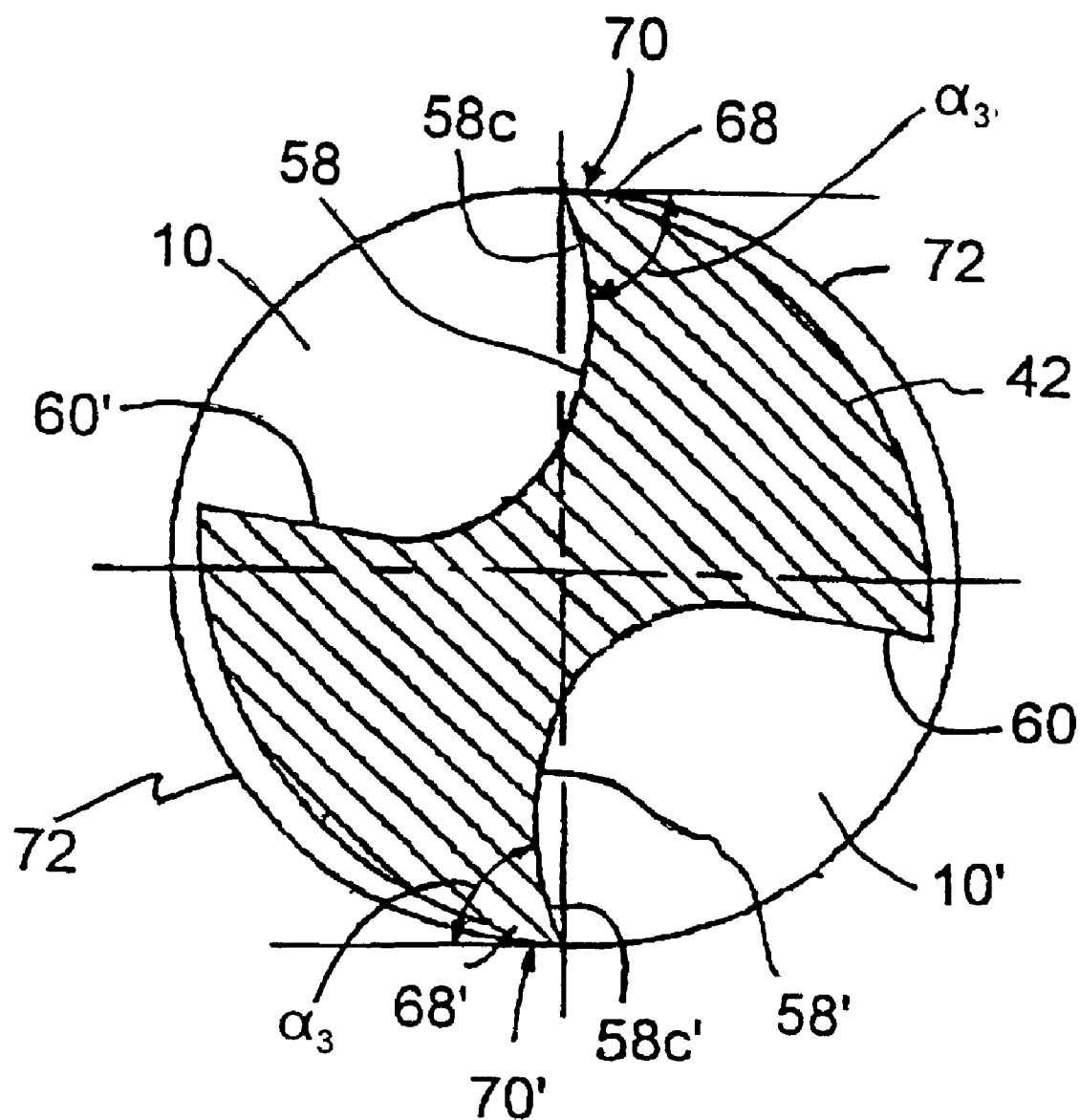

With reference to FIGS. 14A and 14B, the first and second land structures 42 and 42' have corresponding margins or margin formations 68 and 68' which margins or margin formations define hole diameter 72. Each margin 68, 68' is disposed adjacent its corresponding one of the first and second longitudinal cutting edge structures 14, 14', that is, each margin extends longitudinally along its corresponding cutting edge structure 14, 14'. As indicated in FIGS. 14A and 14B, each margin 68, 68' has a corresponding at least partially cylindrical surface 70, 70'. Each leading flute wall 58, 58', particularly portions 58b and 58b', and the corresponding adjacent margin surfaces 70, 70' intersect to form the first angle $\alpha_1$, compare FIG. 14A. The leading flute walls 58, 58', particularly portions 58c, 58c', and the corresponding margin surfaces 70 and 70' intersect to form the second angle $\alpha_3$, compare FIG. 14B.

Figure 15:
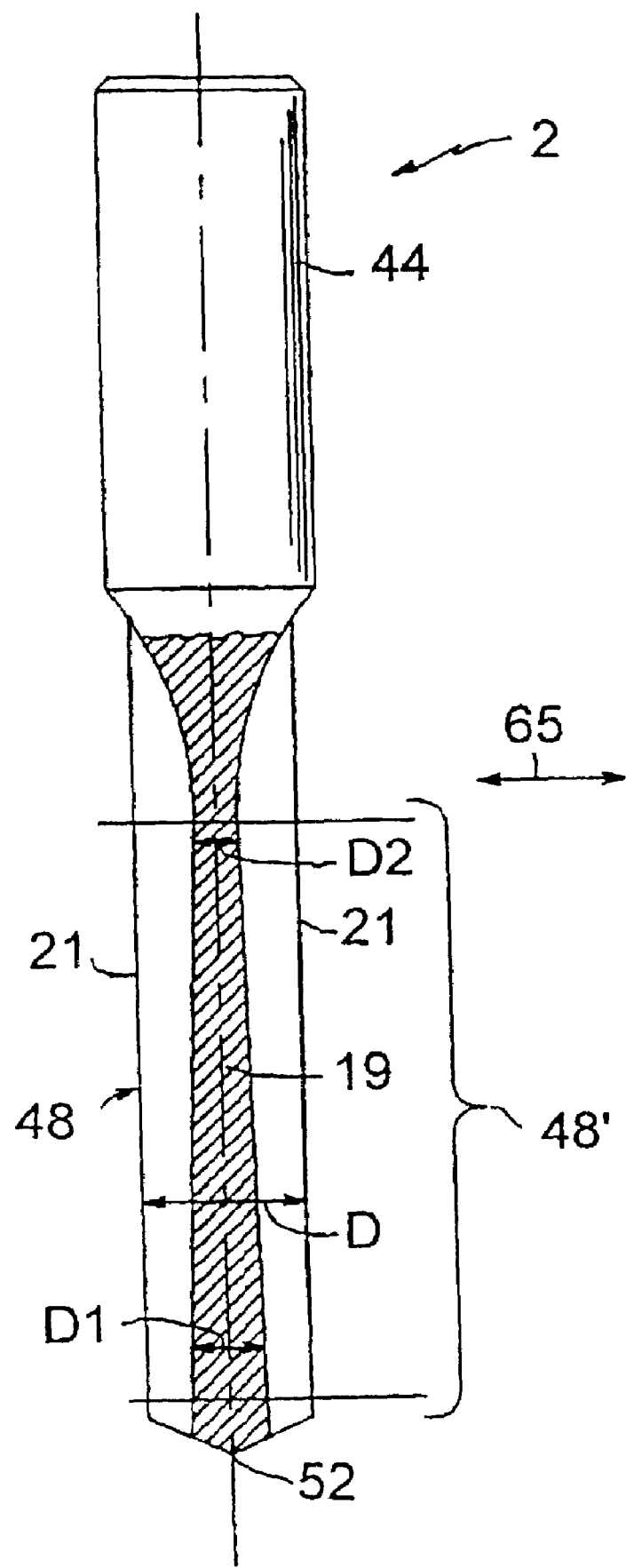
FIG. 15 is an elevation to illustrate an embodiments of a drill with tapered core.

FIG. 15 illustrates a drill 2 with a tapered core 19 that tapers towards the shank 44. FIG. 15 shows the cutting component or cutter portion 48, which may have a cutting length schematically indicated by reference numeral 48', and shows a cross section through the drill core 19. The extension lines 21 which flank the drill core 19 mark the extension of the cutting component 48 in transverse direction 65. They represent the longitudinal section lines of an imaginary envelope having a diameter which corresponds to the diameter D of the cutting section 48. As FIG. 15 clearly shows, the drill core 19 continuously tapers from the drill tip 52 towards the shank 44. The drill core diameter K is therefore greater in the area of the cutting component 48 near the tip 52, compare D1, than in the area close to the shank, compare D2. It will be appreciated that other tapers of the core 19 are within the scope of the present invention.

Figure 16:
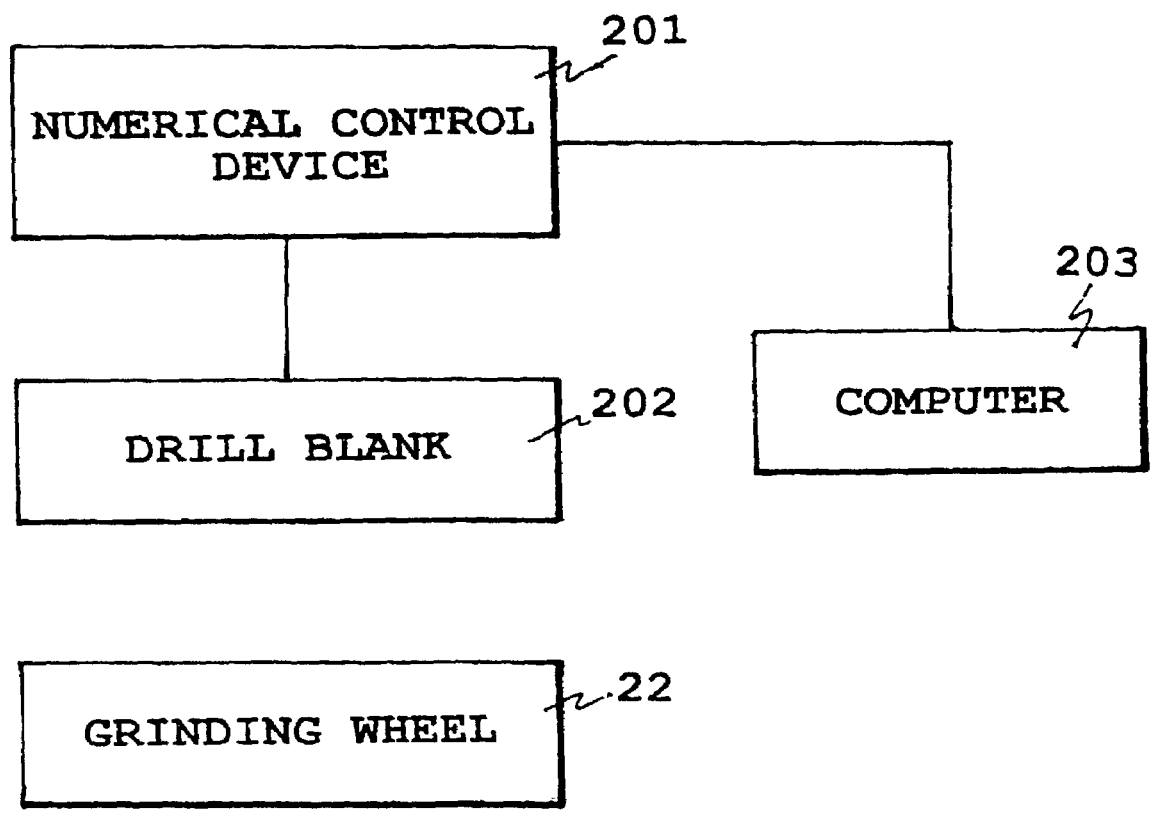
FIG. 16 shows a block diagram to illustrate one possible embodiment of an arrangement to grind a drill blank.

FIG. 16 shows a block diagram of at least one possible embodiment of the present invention. A drill blank 202 and the grinding wheel 22 are represented. In this particular embodiment, the drill blank 202 is mounted in or connected to a numerical control device 201 which controls the three-dimensional movement of the drill blank 202 during the grinding process. The numerical control device 201 moves the drill blank 202 into and out of engagement with the grinding wheel 22 in order to grind the different surfaces and curves, such as helical flutes 10 and 10', or respectively the land structures 42 and 42', to achieve the desired shape of the drill 2. A computer 203 is utilized to program and control the numerical control device 201 to execute a particular series of movements to properly grind the drill 2.

Figure 17:
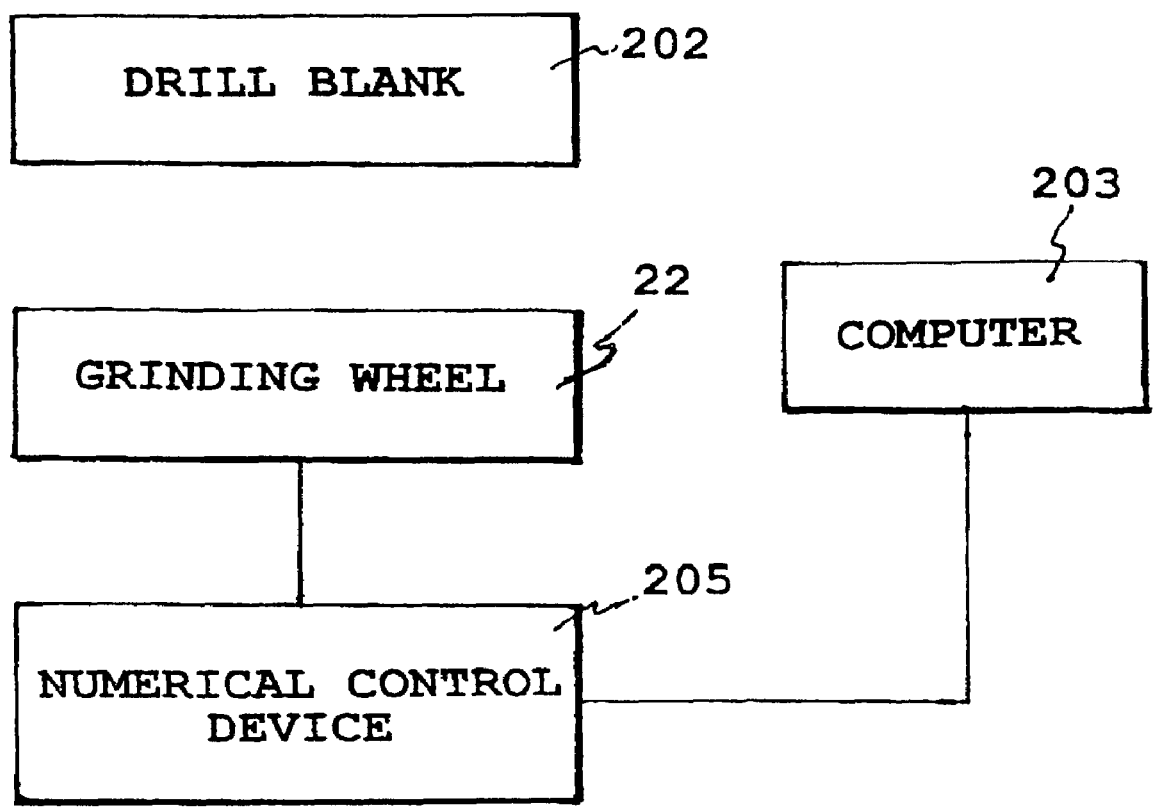
FIG. 17 is a further block diagram to illustrate another possible embodiment of an arrangement to grind a drill blank.

FIG. 17 shows another block diagram of at least one possible embodiment of the present invention, similar to that shown in FIG. 16. However, in this embodiment, the grinding wheel 22 is mounted in or connected to a numerical control device 205 which controls the three-dimensional movement of the grinding wheel 22 during the grinding process. The numerical control device 205 moves the grinding wheel 22 into and out of engagement with the drill blank 202 in order to grind the different surfaces and curves, such as helical flutes 10 and 10', or respectively the land structures 42 and 42', to achieve the desired shape of the drill 2. The computer 203 is utilized to program and control the numerical control device 205 to execute a particular series of movements to properly grind the drill 2.

Figure 18:
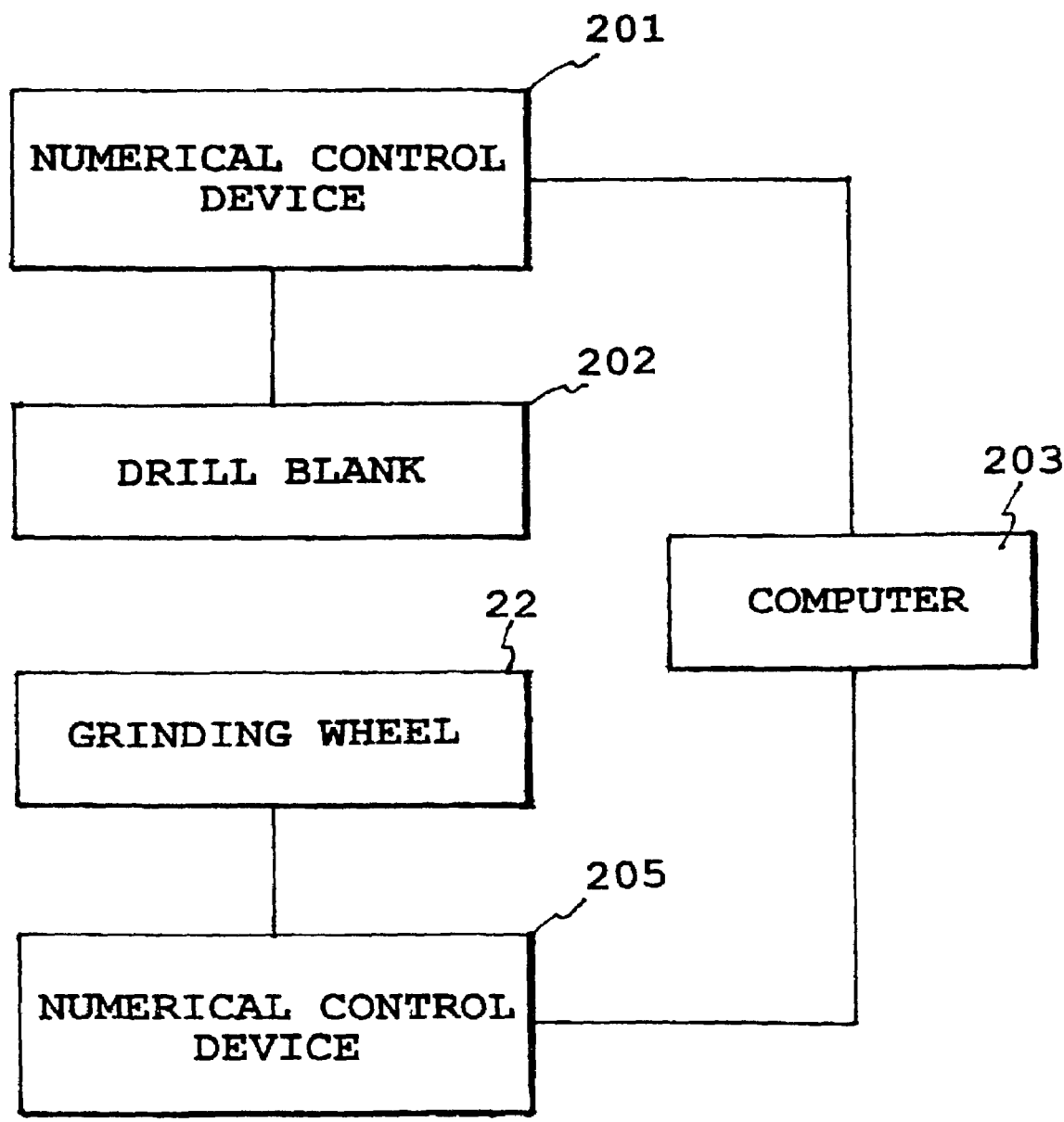
FIG. 18 is yet another block diagram of an arrangement to grind a drill blank.

FIG. 18 shows yet another block diagram of at least one possible embodiment of the present invention, which embodiment combines the features shown in FIGS. 16 and 17. In this embodiment, both the drill blank 202 and the grinding wheel 22 are each mounted in or connected to their respective numerical control devices 201, 205, which control the three-dimensional movement of the drill blank 202 and the grinding wheel 22, respectively, during the grinding process. The numerical control devices 20, 205 move the drill blank 202 and the grinding wheel 22 into and out of engagement with each other in order to grind the different surfaces and curves, such as helical flutes 10 and 10', or respectively the land structures 42 and 42', to achieve the desired shape of the drill 2. The computer 203 is utilized to program and control the numerical control devices 201, 205 to execute a particular series of movements to properly grind the drill 2.

Figure 19:
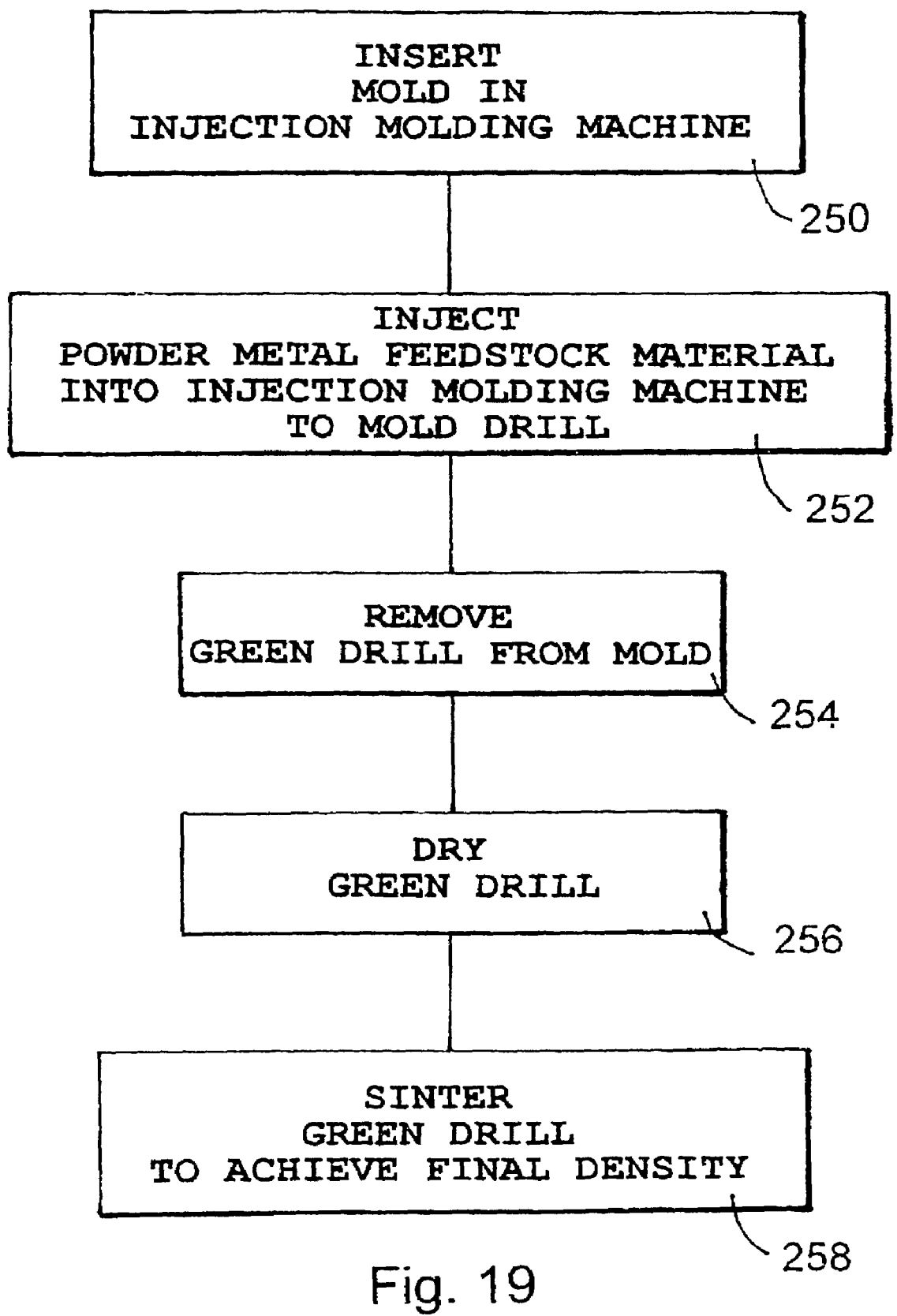
FIG. 19 is a schematic illustration of forming a drill by injection molding.

FIG. 19 illustrates a possible embodiment of a method of forming a drill by injection molding. The method comprises step 250 in which a mold configured the shape a drill is placed in an injection molding machine. In step 252 a predetermined powder metal feedstock material is injected into the injection molding machine. The green drill is removed from the in step 254. The green drill may be dried according to step 256. The green drill is sintered in step 258 to achieve final density.

One feature of the invention resides broadly in a bit (3) for a twist drill (2) that has a plurality of main cutting edges (4) that are connected with one another by a chisel edge (6), adjacent to which main cutting edges, in the longitudinal direction (L) of the drill, are secondary cutting edges (14) that run along flutes (10), whereby a secondary cutting angle ($\gamma$) is defined between a tangent (T) that touches the inside (16) of the respective secondary cutting edge (14) and is oriented perpendicular to the longitudinal direction (L) of the drill and the radial direction (R), characterized by the fact that there are different secondary cutting angles ($\gamma$) in the longitudinal direction (L) of the drill.

Another feature of the invention resides broadly in the bit (3) characterized by the fact that the secondary cutting angle ($\gamma$) increases in the longitudinal direction (L) of the drill.

Yet another feature of the invention resides broadly in the bit (3) characterized by the fact that the secondary cutting angle ($\gamma$) at the main cutting edges (4) lies in the range between +5° and −5°, preferably between 0° and −5°.

Still another feature of the invention resides broadly in the bit (3) characterized by the fact that the main cutting edges (4) run in a straight line toward the chisel edge (6).

A further feature of the invention resides broadly in the bit (3) characterized by the fact that the secondary cutting angle ($\gamma$) increases to a final value ($\gamma_n$) of up to +25°.

Another feature of the invention resides broadly in the bit (3) characterized by the fact that the final value ($\gamma_n$) is achieved in the longitudinal direction (L) of the drill after a length (A) which equals 0.25 to 1.5 times the drill diameter (D), and in particular one times the drill diameter (D).

Yet another feature of the invention resides broadly in the bit (3) characterized by the fact that it has a drill core (19) with a constant core diameter (K) or a core diameter that decreases in the longitudinal direction (L) of the drill.

Still another feature of the invention resides broadly in the method for the manufacture of a flute (10) in the vicinity of a bit (3) for a twist drill (2) with a plurality of main cutting edges (4) that are connected with one another by a chisel edge (6), adjacent to which main cutting edges, in the longitudinal direction (L) of the drill, are secondary cutting edges (14) that run along the flute (10), whereby a secondary cutting angle ($\gamma$) is defined between a tangent (T) that touches the inside (16) of the respective secondary cutting edge (14) and is oriented perpendicular to the longitudinal direction (L) of the drill and the radial direction (R), characterized by the fact that different secondary cutting angles ($\gamma$) are produced in the longitudinal direction (L) of the drill.

A further feature of the invention resides broadly in the method characterized by the fact that the secondary cutting angle ($\gamma$) increases in the longitudinal direction (L) of the drill.

Another feature of the invention resides broadly in the method characterized by the fact that the different secondary cutting angles ($\gamma$) are produced in a continuous grinding process.

Yet another feature of the invention resides broadly in the method characterized by the fact that during the grinding process, a grinding wheel (22) and the bit (3) are guided relative to each other in a multi-dimensional movement in three-dimensional space.

Still another feature of the invention resides broadly in the method characterized by the fact that the grinding wheel (22) is realized in the form of a standard grinding wheel that can be used for a plurality of types of drills.

A further feature of the invention resides broadly in the method characterized by the fact that the different secondary cutting angles ($\gamma$) are manufactured by an injection molding process.

The following patents or patent publications and other publications, also relating to drills and methods of making drills, which were cited in corresponding Federal Republic of Germany patent publication application DE 100 27 544 published on Dec. 13, 2001 are hereby incorporated by reference as if set forth in their entirety herein as follows: Federal Republic of Germany patent publication DE 24 59 286; U.S. Pat. No. 5,088,863 issued to inventors Imanaga et al. on Feb. 18, 1992 and entitled "Twist drill;" and K. Mücke, "Fünfachsige Schleifprogramme automatisch generierten . . . [five-axis grinding programs of automatically generated . . . ]," published in WERKSTATT UND BETRIEB, No. 130, 1997, pages 42–45.

It is to be understood that any of the percentages, or degrees of angles listed above are examples of the dimensions that may be utilized in at least one embodiment according to the present invention. It is to be further understood that one skilled in the art to which the present invention most nearly pertains would be able to modify any or all of the above dimensions in at least one embodiment of the present invention.

For example, in at least one embodiment of the present invention, the core diameter is preferably tapered in a range between 10% and 20%, with reference to a length of approximately 100 mm. Such range can possibly be include increments of at least about 1%, that is the range includes at least 10%, 11%, 12%, 13%, 14%, 15%, 16%, 17%, 18%, 19%, and 20%.

For example, in at least one embodiment of the present invention, the first angle $\alpha_1$ can possibly be in the range including 85 degrees, 86 degrees, 87 degrees, 88 degrees, 89 degrees, 90 degrees, 91 degrees, 92 degrees, 93 degrees, 94 degrees, and 95 degrees. It will be appreciated that smaller increments are included within the range and that the limits of the range may vary.

For example, in at least one embodiment of the present invention, the second angle $\alpha_3$ can possibly be in the range including 65 degrees, 66 degrees, 67 degrees, 68 degrees, 69 degrees, 70 degrees, 71 degrees, 72 degrees, 73 degrees, 74 degrees, 75 degrees, 76 degrees, 77 degrees, 78 degrees, 79 degrees, 80 degrees, 81 degrees, 82 degrees, 83 degrees, 84 degrees, 85 degrees, 86 degrees, 87 degrees, 88 degrees, 89 degrees, and 90 degrees. It will be appreciated that smaller increments are included within the range and that the limits of the range may vary.

For example the secondary cutting angles $\gamma$ referred to herein above, include angles in the range from approximately −5 degrees to approximately 25 degrees, that is to say the range includes −4 degrees, −3 degrees, −2 degrees, −1 degree, 0 degree, 1 degree, 2 degrees, 3 degrees, 4 degrees, 5 degrees, 6 degrees, 7 degrees, 8 degrees, 9 degrees, 10 degrees, 11 degrees, 12 degrees, 13 degrees, 14 degrees, 15 degrees, 16 degrees, 17 degrees, 18 degrees, 19 degrees, 20 degrees, 21 degrees, 22 degrees, 23 degrees and 24 degrees. It will be appreciated that smaller increments are included within the range and that the limits of the range may vary.

Further, depending on the various factors involved, in at least one other embodiment of the present invention, the dimensions of the drill, in particular the chisel edges, could be modified. Such factors as the desired size and depth of the hole to be drilled, the type of material to be drilled, the desired length, width, and circumference of the drill, the type of material the drill is made of, and the desired rotation or gyration of the drill all would affect the necessary dimensions and asymmetrical measurements of the drill. A person skilled in the art to which the present invention most nearly pertains would be able to selectively modify the dimensions to accommodate the requirements of the factors listed herein above.

The invention relates in one aspect to a bit or forward tip portion for a twist drill that has a plurality of main cutting edges that are connected with one another by a chisel edge, adjacent to which main cutting edges in the longitudinal direction of the drill are secondary cutting edges that run along flutes, whereby a secondary cutting angle is defined between a tangent that is adjacent to the respective secondary cutting edge and is oriented perpendicular to the longitudinal direction of the drill and the radial direction.

All of the patents, patent applications and publications recited herein, and in the Declaration attached hereto, are hereby incorporated by reference as if set forth in their entirety herein.

In accordance with one feature of the invention, a bit (3) for a twist drill (2) has several main cutting edges (4) which are interconnected by a chisel edge (6). Secondary cutting edges (14) running along flutes (10) in the longitudinal direction (L) of the drill adjoin said main cutting edges. The secondary effective cutting angle $\gamma$ associated with the secondary cutting edges (14) changes in the longitudinal direction of the drill (L). The main cutting edges (4) are preferably configured in a straight line so that the secondary effective cutting angle in this area is 0°. The adjoining secondary effective angle $\gamma$ increases continuously. This enables the bit (3) to absorb greater loads in the area of the main cutting edges (4) and at the same time, guarantees that the chips are removed rapidly from the bore wall of the workpiece to be processed.

The following patents, patent applications, or patent publications and other publications, which were cited in the International Search Report in International Patent Application No. PCT/EP00/03950, dated Aug. 2, 2000 are hereby incorporated by reference as if set forth in their entirety herein as follows: WO 97 35682 published by WIPO, on Oct. 2, 1997, corresponding to U.S. Pat. No. 6,132,149 issued to inventors Howarth et al on Oct. 17, 2000 and entitled "Twist drills;" U.S. Pat. No. 5,947,659 issued to inventor Mays on Sep. 7, 1999 and entitled "Drill bit;" and U.S. Pat. No. 5,678,960 issued to inventors Just et al. on Oct. 21, 1997 and entitled "Twist drill."

In at least one other embodiment according to the present invention, the circumferential shape of the drill may be one of: elliptical, circular, or oval-shaped.

It will be appreciated that the angular transition between angle $\alpha_1$ and $\alpha_3$ provides the significant advantage that chip residue will be rapidly transported along the length of the flute and from the wall of the hole being drilled and undesirable surface roughness of the wall of the hole will be minimized.

In one possible embodiment of the invention, the angular transition between the first angle $\alpha_1$ and the second angle $\alpha_3$ may be such that the mentioned angle $\alpha_2$ is maintained fixed for a predetermined length along longitudinal axis L to provide a region where the angle $\alpha_2$ is constant.

In one embodiment of the invention, the flute walls 58 and 58' may possibly recede the same distance into the corresponding land structures 42 and 42' for a predetermined length of the cutting edge structures 14 and 14'.

It will be appreciated that the cutting edge structures 14 and 14' may continue along the flute walls with a uniform angle of $\alpha_3$ upon the value of $\alpha_3$ having been reached.

The direction of rotation "C" of the drill may be clockwise or counter clockwise.

The corresponding foreign and international patent publication applications, namely, Federal Republic of Germany Patent Application No. DE 100 27 544.3, filed on Jun. 2, 2000, having inventors Dieter MÜHLFRIEDEL, Bernhard BORSCHERT, and Jürgen SCHWÄGERL, and DE-OS 100 27 544 having inventors Dieter MÜHLFRIEDEL, Bernhard BORSCHERT, and Jürgen SCHWÄGERL, and DE-PS 100 27 544 having inventors Dieter MÜHLFRIEDEL, Bernhard BORSCHERT, and Jürgen SCHWÄGERL, and International Patent Application PCT/EP01/05751, filed on May 19, 2001, published by WIPO with No. WO 01/91959, having inventors Dieter MÜHLFRIEDEL, Bernhard BORSCHERT, and Jürgen SCHWÄGERL, as well as their published equivalents, and other equivalents or corresponding applications, if any, in corresponding cases in the European Community and elsewhere, and the references and documents cited in any of the documents cited herein, such as the patents, patent applications and publications, are hereby incorporated by reference as if set forth in their entirety herein.

The following U.S. patents regarding drills are hereby incorporated by reference as if set forth in their entirety herein: U.S. Pat. No. 5,800,100, issued to Krenzer on Sep. 1, 1998; No. 5,829,926, having attorney docket no. NHL-KEH-06, issued to Kammermeier on Nov. 3, 1998; U.S. Pat. No. 5,967,710, issued to Krenzer on Oct. 9, 1999; U.S. Pat. No. 6,045,301, issued to Kammermeier et al. on Apr. 4, 2000; U.S. Pat. No. 6,116,825, issued to Kammermeier et al. on Sep. 12, 2000; U.S. Pat. No. 6,164,879, issued to Krenzer on Dec. 26, 2000; U.S. Pat. No. 6,210,083, issued to Kammermeier et al. on Apr. 3, 2001; U.S. Pat. No. 6,231,276, issued to Müller et al. on May 15, 2001; U.S. Pat. No. 5,904,455, issued to inventors Krenzer et al. on May 18, 1999; and U.S. Pat. No. 6,309,149, issued to inventor Borschert Oct. 30, 2001. The following U.S. patent applications regarding drills are hereby incorporated by reference as if set forth in their entirety herein: Ser. No. 09/521,134, having inventors Gebhard MÜLLER and Horst JAGER, filed on Mar. 8, 2000; Ser. No. 09/927,921, having inventors Bernhard Walter BORSCHERT, Jochen STIES, Dieter Hermann MÜHLFRIEDEL, and Karl-Heinz WENDT, filed on Aug. 10, 2001; Ser. No. 09/935,078, having inventors Hans-Wilm HEINRICH, Manfred WOLF, and Dieter SCHMIDT, filed on Aug. 22, 2001; Ser. No. 09/966,735, having inventor Ulrich KRENZER, filed on Sep. 28, 2001; and Ser. No. 10/008,528, having inventor Rudi HARTLOHNER, filed on Nov. 5, 2001; Ser. No. 10/0614,448, having inventor Urich KRENZER filed on Feb. 1, 2002; and Ser. No. 10/147,444, having inventors Bernhard BORSCHERT and Dieter MÜHLFRIEDEL filed on May 16, 2002.

All of the references and documents, cited in any of the documents cited herein, and the references they are in turn cited in are hereby incorporated by reference as if set forth in their entirety herein. All of the documents cited herein, referred to in the immediately preceding sentence, include all of the patents, patent applications and publications cited anywhere in the present application. All of the references included herein as aforesaid include the corresponding equivalents published by the United States Patent and Trademark Office and elsewhere.

Some examples of drills and/or drill bits that may possibly be utilized or adapted for use in at least one possible embodiment of the present invention may be found in the following U.S. patents: U.S. Pat. No. 6,241,036 B1, issued to Lovato et al. on Jun. 5, 2001; U.S. Pat. No. 6,220,117 B1, issued to Butcher on Apr. 24, 2001; U.S. Pat. No. 6,135,218, issued to Deane et al. on Oct. 24, 2000; U.S. Pat. No. 6,029,544, issued to Katayama on Feb. 29, 2000; U.S. Pat. No. 5,979,571, issued to Scott et al. on Nov. 9, 1999; U.S. Pat. No. 5,882,152, issued to Janitzki on Mar. 16, 1999; U.S. Pat. No. 5,836,409, issued to Vail, III on Nov. 17, 1998; U.S. Pat. No. 5,743,346, issued to Flood et al. on Apr. 28, 1998; U.S. Pat. No. 5,740,872, issued to Smith on Apr. 21, 1998; U.S. Pat. No. 5,725,313, issued to Singh et al. on Mar. 10, 1998; U.S. Pat. No. 5,421,425, issued to Griffin on Jun. 6, 1995; U.S. Pat. No. 5,154,550, issued to Isobe et al. on Oct. 13, 1992; U.S. Pat. No. 4,971,485, issued to Nomura et al. on Nov. 20, 1990; U.S. Pat. No. 4,826,368, issued to Tikal et al. on May 2, 1989; U.S. Pat. No. 4,720,371, issued to Shirley on Jan. 19, 1988; U.S. Pat. No. 4,506,432, issued to Smith on Mar. 26, 1985; U.S. Pat. No. 4,241,483, issued to Voitas on Dec. 30, 1980; U.S. Pat. No. 4,211,294, issued to Multakh on Jul. 8, 1980; U.S. Pat. No. 4,200,159, issued to Peschel et al. on Apr. 29, 1980; U.S. Pat. No. 4,169,637, issued to Voitas on Oct. 2, 1979; and U.S. Pat. No. 4,087,137, issued to Voitas on May 2, 1978. All the patents cited herein are incorporated by reference as if fully set forth in their entirety herein.

Some examples of milling cutters that may possibly be utilized or adapted for use in at least one possible embodiment of the present invention may be found in the following U.S. patents: U.S. Pat. No. 6,231,281 B1, issued to Nishikawa on May 15, 2001; U.S. Pat. No. 6,220,795 B1, issued to Matthews on Apr. 24, 2001; U.S. Pat. No. 6,217,262 B1, issued to Wright on Apr. 17, 2001; U.S. Pat. No. 6,176,648 B1, issued to Mizutani on Jan. 23, 2001; U.S. Pat. No. 6,158,927, issued to Cole et al. on Dec. 12, 2000; and U.S. Pat. No. 6,146,059, issued to Rohr on Nov. 14, 2000. All the patents cited herein are incorporated by reference as if fully set forth in their entirety herein.

The components disclosed in the various publications, disclosed or incorporated by reference herein, may be used in the embodiments of the present invention, as well as equivalents thereof.

Some examples of grinding devices or grinding methods for use in grinding drills which may possibly be used in at least one possible embodiment of the present invention may possibly be found in the following U.S. patents: U.S. Pat. No. 6,431,962 entitled "Method and apparatus for making a cutting tool having a flute"; U.S. Pat. No. 6,071,047 entitled, "Method and apparatus for feeding coolant liquid and separating and recovering it in cutting machine and grinding machine"; U.S. Pat. No. 5,735,732 entitled "Precision drill sharpener and grinding wheel assembly therefor"; U.S. Pat. No. 5,649,853 entitled "Drill bit grinding machine"; U.S. Pat. No. 5,311,703 entitled "Multiple purpose tool grinding device"; U.S. Pat. No. 5,263,286 entitled "Drill and drill grinding method and apparatus"; U.S. Pat. No. 5,231,802 entitled "Drill and drill grinding method and apparatus"; U.S. Pat. No. 5,210,977 entitled "Drill grinding device"; U.S. Pat. No. 5,181,811 entitled "Drill and drill grinding method and apparatus"; U.S. Pat. No. 5,179,809 entitled "Drill grinding machine"; U.S. Pat. No. 5,125,186 entitled "Drill grinding machine"; U.S. Pat. No. 5,090,159 entitled "Multi-purpose grinder"; U.S. Pat. No. 4,858,389 entitled "Apparatus for grinding twist drills"; U.S. Pat. No. 4,680,896 entitled "Tool unloading mechanism for automatic tool grinding machine"; U.S. Pat. No. 4,608,643 entitled "Automatic tool grinding machine with computerized control"; U.S. Pat. No. 4,590,711 entitled "Semi-automatic grinding machine"; U.S. Pat. No. 4,574,529 entitled "Apparatus for grinding twist drills"; U.S. Pat. No. 4,574,528 entitled "Apparatus for grinding twist drills"; U.S. Pat. No. 4,468,891 entitled "Machine for point grinding drills"; U.S. Pat. No. 4,365,444 entitled "Drill point grinding machine"; U.S. Pat. No. 4,148,161 entitled "Loading unit for an automatic bur grinding machine"; and U.S. Pat. No. 4,142,332 entitled "Drill grinding fixture". All the patents cited herein are incorporated by reference as if fully set forth in their entirety herein.

The appended drawings in their entirety, including all dimensions, proportions and/or shapes in at least one embodiment of the invention, are accurate and are hereby included by reference into this specification.

Some examples of numerical control systems or devices which may possibly be used or adapted for use in at least one possible embodiment of the present invention may possibly be found in the following U.S. patents: U.S. Pat. No. 6,384,560 entitled "Abnormality detection apparatus for tool and numerical control apparatus provided with same"; U.S. Pat. No. 6,344,724 entitled "Numerical control apparatus for NC machine tool"; U.S. Pat. No. 6,232,736 entitled "Numerical control machine tool positioning system"; U.S. Pat. No. 6,107,768 entitled "Numerical control apparatus for a machine tool"; U.S. Pat. No. 6,036,347 entitled "Numerical control information generator for controlling machine tool processes which require tool exchanges"; U.S. Pat. No. 5,815,400 entitled "Machining method using numerical control apparatus"; U.S. Pat. No. 5,608,641 entitled "Method and apparatus for simplifying the task of retrieving and accessing a segment of a numerical control (NC) program"; U.S. Pat. No. 5,603,149 entitled "Table replacement apparatus in a numerical control router"; U.S. Pat. No. 5,532,932 entitled "Numerical control unit"; U.S. Pat. No. 5,493,502 entitled "Numerical control unit for controlling a machine tool to machine a workpiece at an instructed feed rate along linear and rotational axes"; U.S. Pat. No. 5,493,193 entitled "Numerical control apparatus and numerical control method"; U.S. Pat. No. 5,486,746 entitled "Positioning rule stopper apparatus in a numerical control router"; U.S. Pat. No. 5,465,215 entitled "Numerical control method and apparatus"; U.S. Pat. No. 5,323,821 entitled "Suction table apparatus of a numerical control router"; U.S. Pat. No. 5,270,915 entitled "Apparatus for generating numerical control information based on shaped data for each machining step"; and U.S. Pat. No. 5,255,201 entitled "Numerical control information generating apparatus". All the patents cited herein are incorporated by reference as if fully set forth in their entirety herein.

All, or substantially all, of the components and methods of the various embodiments may be used with at least one embodiment or all of the embodiments, if more than one embodiment is described herein.

Some examples of high strength steel that may possibly be utilized or adapted for use in at least one possible embodiment of the present invention may possibly be found in the following U.S. patents: U.S. Pat. No. 4,578,113, issued to Rana et al. on Mar. 25, 1986; U.S. Pat. No. 4,720,307, issued to Matsumoto et al. on Jan. 19, 1988; U.S. Pat. No. 4,814,141, issued to Imai et al. on Mar. 21, 1989; U.S. Pat. No. 4,826,543, issued to Yano et al. on May 2, 1989; U.S. Pat. No. 4,956,025, issued to Koyama et al. on Sep. 11, 1990; U.S. Pat. No. 5,651,938, issued to Thomson et al. on Jul. 29, 1997; U.S. Pat. No. 5,772,957, issued to Thomson et al. on Jun. 30, 1998; and U.S. Pat. No. 5,798,004, issued to Tamehiro et al. on Aug. 25, 1998. All the patents cited herein are incorporated by reference as if fully set forth in their entirety herein.

The details in the patents, patent applications and publications may be considered to be incorporable, at Applicants' option, into the claims during prosecution as further limitations in the claims to patentably distinguish any amended claims from any applied prior art.

Some examples of titanium nitride coating of drills, features of which may possibly be used or adapted for use in at least one possible embodiment of the present invention may possibly be found in the following: U.S. Pat. No. 6,443,674 issued to Jaconi on Sep. 3, 2002 and entitled "Self-centering twist drill having a modified flat bottom section and a helical crown point tip;" U.S. Pat. No. 6,055,886 issued to Tank et al. on May 2, 2000 and entitled "Drill blank;" U.S. Pat. No. 5,641,251 issued to Leins et al. on Jun. 24, 1997 and entitled "All-ceramic drill bit;" U.S. Pat. No. 5,636,948 issued to Rexius on Jun. 10, 1997 and entitled "Drill for synthetic fiber filled plastic and like materials;" U.S. Pat. No. 4,704,055 issued to Gühring on Nov. 3, 1987 and entitled "Drill with cooling channel;" and U.S. Pat. No. 4,694,710 issued to Phall on Sep. 22, 1987 and entitled "Method of making a blank of a drill bit." All the patents cited herein are incorporated by reference as if fully set forth in their entirety herein.

An example of a twist drill with a conical core can be found in U.S. Pat. No. 5,678,960 issued to Just et al on Oct. 21, 1997 and entitled "Twist drill." All the patents cited herein are incorporated by reference as if fully set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

Some examples of injection molding of drills or drill components and metal parts, features of which may possibly be utilized or adapted for use in at least one possible embodiment of the present invention may possibly be found in the following U.S. patents: U.S. Pat. No. 5,971,673 issued to Berglund et al. on Oct. 26, 1999 and entitled "Two-piece rotary metal-cutting tool and method for interconnecting the pieces;" U.S. Pat. No. 5,988,953 issued to Berglund et al. on Nov. 23, 1999 and entitled "Two-piece rotary metal-cutting tool and method for interconnecting the pieces;" U.S. Pat. No. 6,056,915 issued to Behi et al. on May 2, 2000 and entitled "Rapid manufacture of metal and ceramic tooling;" U.S. Pat. No. 6,315,935 issued to Schoonover et al. on Nov. 13, 2001 and entitled "Low pressure injection molding of knife blades from metal feedstocks;" U.S. Pat. No. 6,428,595 issued to Hayashi et al. on Aug. 6, 2002 and entitled "Metal sintered body and production method thereof;" and U.S. Pat. No. 6,444,167 issued to Shimodaira et al. on Sep. 3, 2002 and entitled "Method of forming undercut in metal powder injection-molded article." All the patents cited herein are incorporated by reference as if fully set forth in their entirety herein.

Some examples of sintering drills and drill components features of which may possibly be utilized or adapted for use in at least one possible embodiment of the present invention may possibly be found in the following U.S. patents: U.S. Pat. No. 4,704,055 issued to Gühring on Nov. 3, 1987 and entitled "Drill with cooling channel"; U.S. Pat. No. 4,713,286 issued to Bunting et al. on Dec. 15, 1987 and entitled "Printed circuit board drill and method of manufacture;" U.S. Pat. No. 4,762,445 issued to Bunting et al. on Aug. 9, 1988 and entitled "Composite sintered twist drill;" U.S. Pat. No. 4,971,485 issued to Nomura et al. on Nov. 20, 1990 and entitled "Cemented carbide drill;" U.S. Pat. No. 6,027,808 issued to Aoki et al. on Feb. 22, 2000 and entitled "Cemented carbide for a drill, and for a drill forming holes in printed circuit boards which is made of the cemented carbide;" and U.S. Pat. No. 6,182,533 issued to Tank on Feb. 6, 2001 and entitled "Method of making a drill blank." All the patents cited herein are incorporated by reference as if fully set forth in their entirety herein. The Abstract of the Disclosure is included herein as required by MPEP §608.01 (b) and 37 C.F.R. §1.72. The Abstract of the Disclosure does not limit the invention in any way, and should not be considered if the patent is ever in litigation.

The invention as described hereinabove in the context of the preferred embodiments is not to be taken as limited to all of the provided details thereof, since modifications and variations thereof may be made without departing from the spirit and scope of the invention.

| AT LEAST PARTIAL INDEX OF NOMENCLATURE | | | |
|---|---|---|---|
| 2 | Drill | | |
| 3 | Drill bit | Y | Secondary cutting angle |
| 4 | Main cutting edge | $Y_n$ | Final value |
| 6 | Chisel edge | | |
| 8 | Main clearance face | A | Length |
| 9 | Cooling boring | B | Axis of pivoting |
| 10 | Flute | B' | Center of motion |
| 12 | Cutting face | C | Axis of rotation |
| 13 | Protective bevel | D | Drill diameter |
| 14 | Secondary cutting edge | K | Core diameter |
| 16 | Inside | L | Longitudinal direction of drill |
| 18 | Cutting area | R | Radial direction |
| 19 | Drill core | S | Axis of rotation |
| 20 | Collet | T | Tangent |
| 22 | Grinding wheel | Y | Direction of movement |
| 24 | Lateral surface | X | Lateral axis |
| 26 | End surface | Z | Downfeed axis |
| 30 | Curvature | | |
| 32 | Peripheral area | | |

What is claimed is:

1. A twist drill configured to drill a hole in a metal object, said twist drill comprising:

a cylindrical drill body;

said drill body having a central longitudinal axis of rotation about which said drill is configured to rotate during use;

a shank portion;

said shank portion being configured to be retained by an arrangement to rotate said drill to cut a hole in a metal object;

a cutter portion;

said cutter portion comprising a first portion being disposed immediately adjacent said shank portion and also comprising a second portion opposite said first portion of said cutter portion;

a tip portion configured to drill a hole in a metal object to be drilled;

said tip portion comprising:

a base portion and a top portion;

said base portion being disposed immediately adjacent said second portion of said cutter portion;

an at least partially conical surface;

a first chip face and a second chip face, each forming a portion of said at least partially conical surface of said tip portion;

a second chip face forming a portion of said at least partially conical surface of said tip portion;

a chisel edge arrangement configured to initiate cutting of an object to be drilled;

said chisel edge arrangement being disposed between said first chip face and said second chip face;

said chisel edge arrangement comprising:

a first chisel edge portion and a second chisel edge portion;

each of said chisel edge portions being disposed to extend away from each other from said central longitudinal axis; and said first chisel edge portion and said second chisel edge portion being symmetric with respect to one another about said central longitudinal axis;

said tip portion also comprising:

a first, primary, cutting lip, configured to drill a hole in a metal object, being disposed between said first chisel edge portion and said base portion of said tip portion;

a second, primary, cutting lip, configured to drill a hole in a metal object, being disposed between said second chisel edge portion and said base portion of said tip portion;

said first cutting lip and said second cutting lip being substantially symmetric with respect to one another about said central longitudinal axis;

said cutter portion comprising:

a first and a second helical land structure, each being configured and disposed to provide a first helical flute surface and a second helical flute surface, both flute surfaces being configured to remove chip residue produced by said drill upon drilling;

said first helical land structure and said second helical land structure each comprising:

a first, leading, flute wall configured and disposed to make cutting contact with a metal object to be drilled by said drill;

a second, trailing, flute wall;

the leading flute wall being configured to lead the trailing flute wall in the direction of rotation upon drilling of a metal object; and an at least partially cylindrical land surface that is disposed further away from said longitudinal axis of rotation than a substantial portion of its corresponding flute surface;

the leading flute wall of said first helical land structure being joined to the trailing flute wall of said second helical land structure to configure said first helical flute surface;

the leading flute wall of said second helical land structure being joined to the trailing flute wall of said first helical land structure to configure said second helical flute surface;

each leading flute wall of said first helical land structure and said second helical land structure comprising corresponding first and second longitudinal cutting edge structures, each longitudinal cutting edge structure being disposed at least along a substantial portion of its corresponding leading flute wall of its corresponding helical land structure;

each longitudinal cutting edge structure having a first portion disposed at or adjacent said base portion of said tip portion and also having a second portion disposed away from said tip portion of said drill;

each leading flute wall of said first and second helical land structures having a first portion being disposed at or adjacent its corresponding longitudinal cutting edge structure, each said first portion of each leading flute wall being disposed at or adjacent said tip portion; and each at least partially cylindrical land surface having a first portion being disposed at or adjacent its corresponding longitudinal cutting edge structure, each said first portion of each land surface being disposed at or adjacent said tip portion;

each said first portion of each leading flute wall and each adjacent corresponding first portion of each corresponding at least partially cylindrical land surface being disposed at a first angle with respect to one another;

each leading flute wall of said first and second helical land structure having a second portion being disposed at or adjacent its corresponding longitudinal cutting edge structure, each said second portion of each leading flute wall being disposed at or adjacent its corresponding second portion of said longitudinal cutting edge structure;

each at least partially cylindrical land surface having a second portion being disposed at or adjacent its corresponding longitudinal cutting edge structure, said second portion of said land surface being disposed at or adjacent its corresponding second portion of said longitudinal cutting edge structure;

each said second portion of each leading flute wall and each adjacent corresponding second portion of each corresponding at least partially cylindrical land surface being disposed at a second angle with respect to one another; and said first angle being greater than said second angle;

each leading flute wall being configured to extend further into its corresponding helical land structure at its corresponding second portion of its corresponding cutting edge structure than at said tip portion of said drill to provide a greater amount of drill material at said tip portion at or adjacent its corresponding cutting lip of said drill to minimize stress at said tip portion at or adjacent its corresponding cutting lip and to provide a greater flute volume of its corresponding helical flute per length along said longitudinal axis of rotation at its corresponding second portion that is disposed away from said tip portion than the flute volume of its corresponding helical flute per length along said longitudinal axis of rotation at said tip portion to maximize removal of chip residue in its corresponding flute upon drilling.

2. The twist drill configured to drill a hole in a metal object, according to claim 1, including at least one of (I.), (II.), (III.), (IV.), (V.), (VI.), (VII.), and (VIII.), wherein (I.), (II.), (III.), (IV.), (V.), (VI.), (VII.), and (VIII.) are:

(I.) said second portion of said longitudinal cutting edge structure is disposed a substantial distance from said first portion of said longitudinal cutting edge structure;

(II.) angles between said first angle and said second angle form an angular transition between said first angle and said second angle;

said angular transition comprises at least one of (a.), (b.), (c.), and (d.), wherein (a.), (b.), (c.), and (d.) are:
(a.) said angular transition is configured to result in the minimization of contact of chip residue against a wall of a hole being drilled by said drill;
(b.) said angular transition is also configured to result in the minimization of time required for removal of chip residue;
(c.) said angular transition is further configured to result in minimization of surface roughness of a wall of a hole being drill by said drill; and
(d.) said angular transition is continuous;

(III.) said first angle is disposed adjacent its corresponding cutting lip;
said first angle comprises one of (i.) and (ii.), wherein (i.) and (ii.) are:
(i.) an angle within the range between approximately 95° and approximately 85°; and
(ii.) an angle within the range between approximately 90° and approximately 95°;
(IV.) each cutting lip comprises a straight portion that extends toward said chisel edge portion;
(V.) said second angle comprises one of (i.) and (ii.), wherein (i.) and (ii.) are:
(i.) an angle within the range between approximately 90° to approximately 65°; and
(ii.) an angle of approximately 65°;
(VI.) said drill has a diameter; and
said second angle is disposed at a distance away from said tip portion, in the direction of said longitudinal axis of rotation, equal to one of (i.) and (ii.), wherein (i.) and (ii.) are:
(i.) 0.25 to 1.5 times the magnitude of said drill diameter; and
(ii.) the magnitude of said drill diameter;
(VII.) said drill comprises a core, along said longitudinal axis, from which said first and second helical land structures extend;
said first and second helical flute surfaces each have a portion disposed closer to said longitudinal axis than other portions of each of said first and second helical flute surfaces to define said core;
each said closer portions being disposed a first distance from said longitudinal axis;
said first distance defining a radius and thus a core diameter of said core;
said core diameter comprises one of (i.), (ii.), and (iii.), wherein (i ) (ii.), and (iii.) are:
(i.) a substantially constant core diameter;
(ii.) a core diameter that decreases from said tip portion towards said shank portion; and
(iii.) a core diameter that increases from said tip portion towards said shank portion; and
(VIII.) each at least partially cylindrical land surface comprises a margin;
each said margin is disposed adjacent its corresponding one of said first and second longitudinal cutting edge structures;
each said margin comprises an at least partially cylindrical surface;
each leading flute wall and its corresponding margin surface intersecting to form said first angle;
each leading flute wall and its corresponding margin surface intersecting to form said second angle.

3. The twist drill configured to drill a hole in a metal object, according to claim 1, including all of (I.), (II.), (III.), (IV.), (V.), (VI.), (VII.), and (VIII.), wherein (I.), (II.), (III.), (IV.), (V.), (VI.), (VII.), and (VIII.) are:
(I.) said second portion of said longitudinal cutting edge structure is disposed a substantial distance from said first portion of said longitudinal cutting edge structure;
(II.) angles between said first angle and said second angle form an angular transition between said first angle and said second angle;
said angular transition comprises at least one of (a.), (b.), (c.), and (d.), wherein (a.), (b.), (c.), and (d.) are:
(a.) said angular transition is configured to result in the minimization of contact of chip residue against a wall of a hole being drilled by said drill;

(b.) said angular transition is also configured to result in the minimization of time required for removal of chip residue;
(c.) said angular transition is further configured to result in minimization of surface roughness of a wall of a hole being drill by said drill; and
(d.) said angular transition is continuous;
(III.) said first angle is disposed adjacent its corresponding cutting lip;
said first angle comprises one of (i.) and (ii.), wherein (i.) and (ii.) are:
  (i.) an angle within the range between approximately 95° and approximately 85°; and
  (ii.) an angle within the range between approximately 90° and approximately 95°;
(IV.) each cutting lip comprises a straight portion that extends toward said chisel edge portion;
(V.) said second angle comprises one of (i.) and (ii.), wherein (i.) and (ii.) are:
  (i.) an angle within the range between approximately 90° to approximately 65°; and
  (ii.) an angle of approximately 65°;
(VI.) said drill has a diameter; and
said second angle is disposed at a distance away from said tip portion, in the direction of said longitudinal axis of rotation, equal to one of (i.) and (ii.), wherein (i.) and (ii.) are:
  (i.) 0.25 to 1.5 times the magnitude of said drill diameter; and
  (ii.) the magnitude of said drill diameter; and
(VII.) said drill comprises a core, along said longitudinal axis, from which said first and second helical land structures extend;
said first and second helical flute surfaces each have a portion disposed closer to said longitudinal axis than other portions of each of said first and second helical flute surfaces to define said core;
each said closer portions being disposed a first distance from said longitudinal axis;
said first distance defining a radius and thus a core diameter of said core;
said core diameter comprises one of (i.), (ii.), and (iii.), wherein (i.), (ii.), and (iii.) are:
  (i.) a substantially constant core diameter;
  (ii.) a core diameter that decreases from said tip portion towards said shank portion; and
  (iii.) a core diameter that increases from said tip portion towards said shank portion; and
(VIII.) each at least partially cylindrical land surface comprises a margin;
each said margin is disposed adjacent its corresponding one of said first and second longitudinal cutting edge structures;
each said margin comprises an at least partially cylindrical surface;
each leading flute wall and its corresponding margin surface intersecting to form said first angle;
each leading flute wall and its corresponding margin surface intersecting to form said second angle.

4. A drill configured to drill a hole in an object, said drill comprising:
a drill material;
a longitudinal axis of rotation about which said drill is configured to rotate during use;
a tip portion comprising at least one cutting lip; and
at least one land structure configured to form at least one flute to remove chip residue produced upon drilling;
each said at least one land structure comprising at least one flute wall and a cutting edge structure;
said cutting edge structure being disposed longitudinally along at least a portion of said at least one flute wall of said at least one land structure;
said cutting edge structure comprising a first portion at or adjacent said tip portion and a second portion disposed away from said tip portion; and
at least one of (a.) and (b.), wherein (a.) and (b.) are:
  (a.) said drill material comprising the same drill material from said tip portion to said second portion of said cutting edge structure disposed away from said tip portion; and
    said at least one flute wall being configured to extend further into at least one adjacent land structure at said second portion of said cutting edge structure than into at least one land structure at or adjacent said tip portion of said drill to provide a greater amount of said drill material at said tip portion than at said second portion of said cutting edge structure; and
  (b.) said at least one flute wall being configured to extend further into at least one adjacent land structure at said second portion of said cutting edge structure than into at least one land structure at or adjacent said tip portion of said drill to provide a greater flute volume of said at least one flute per length along said longitudinal axis at said second portion of said cutting edge structure that is disposed away from said tip portion than the flute volume of said at least one flute per length along said longitudinal axis at said tip portion.

5. The drill configured to drill a hole in an object, according to claim 4, wherein:
said second portion of said cutting edge structure is disposed a substantial distance from said first portion of said cutting edge structure.

6. The drill configured to drill a hole in an object, according to claim 4, wherein:
of (a.) and (b.) only (a.);
(a.) being configured to minimize stress at said tip portion at least at or adjacent said at least one cutting lip.

7. The drill configured to drill a hole in an object, according to claim 4, wherein:
of (a.) and (b.) only (b.);
(b.) being configured to maximize removal of chip residue in said at least one flute upon drilling.

8. The drill configured to drill a hole in an object, according to claim 5, wherein of (a.) and (b.), both (a.) and (b.);
(a.) being configured to minimize stress at said tip portion at least at or adjacent said at least one cutting lip; and
(b.) being configured to maximize removal of chip residue in said at least one flute upon drilling.

9. The drill configured to drill a hole in an object, according to claim 8, wherein:
said tip portion comprises a chisel edge portion;
each said at least one cutting lip comprises a plurality of cutting lips at said tip portion;
each one of said plurality of cutting lips being connected to said chisel edge portion;
each said at least one land structure comprises a plurality of land structures;
each said at least one flute comprises a plurality of flutes;
each said at least one flute wall comprises a plurality of flute walls;
each flute comprises a pair of flute walls of said plurality of flute walls;

each said pair of flute walls comprises a leading flute wall and a trailing flute wall; said leading flute wall being configured and disposed to lead said trailing flute wall in the direction of rotation upon drilling of an object;

each said plurality of land structures comprises a land surface;

each leading flute wall and its adjacent land surface intersecting to form a first angle adjacent said tip portion of said drill; and each leading flute wall and its adjacent land surface intersecting to form a second angle at said second portion of each cutting edge structure disposed away from said tip portion of said drill;

said first angle is greater than said second angle.

10. The drill configured to drill a hole in an object, according to claim 9, wherein:

angles between said first angle and said second angle form an angular transition between said first angle and said second angle;

said angular transition comprises at least one of (a.), (b.), (c.), and (d.), wherein (a.), (b.), (c.), and (d.) are:

(a.) said angular transition is configured to result in the minimization of contact of chip residue against a wall of a hole being drilled by said drill;

(b.) said angular transition is also configured to result in the minimization of time required for removal of chip residue;

(c.) said angular transition is further configured to result in minimization of surface roughness of a wall of a hole being drill by said drill; and (d.) said angular transition is continuous.

11. The drill configured to drill a hole in an object, according to claim 10, wherein:

said first angle is disposed adjacent its corresponding cutting lip;

said first angle comprises one of (i.) and (ii.), wherein (i.) and (ii.) are:

(i.) an angle within the range between approximately 95° and approximately 85°; and (ii.) an angle within the range between approximately 90° and approximately 95°.

12. The drill configured to drill a hole in an object, according to claim 11, wherein:

each cutting lip comprises a straight portion that extends toward said chisel edge portion.

13. The drill configured to drill a hole in an object, according to claim 12, wherein:

said second angle comprises one of (i.) and (ii.), wherein (i.) and (ii.) are:

(i.) an angle within the range between approximately 90° to approximately 65° ; and (ii.) an angle of approximately 65°.

14. The drill configured to drill a hole in an object, according to claim 13, wherein:

said drill has a diameter; and said second angle is disposed at a distance away from said tip portion, in the direction of said longitudinal axis of rotation, equal to one of (i.) and (ii.), wherein (i.) and (ii.) are:

(i.) 0.25 to 1.5 times the magnitude of said drill diameter; and (ii.) the magnitude of said drill diameter.

15. The drill configured to drill a hole in an object, according to claim 14, wherein:

said drill comprises a shank portion; and said drill comprises a core, along said longitudinal axis, from which said land structures extend;

each of said plurality of flutes has a portion disposed closer to said longitudinal axis than other portions of each of said plurality of flutes to define said core;

each said closer portions being disposed a first distance from said longitudinal axis;

said first distance defining a radius and thus a core diameter of said core;

said core diameter comprises one of (i.), (ii.), and (iii.), wherein (i.), (ii.), and (iii.) are:

(i.) a substantially constant core diameter;

(ii.) a core diameter that decreases from said tip portion towards said shank portion; and (iii.) a core diameter that increases from said tip portion towards said shank portion.

16. The drill configured to drill a hole, according to claim 15, wherein:

each land surface comprises a margin disposed adjacent its corresponding one of said cutting edge structures;

each margin comprises a surface;

each leading flute wall and its corresponding margin surface intersecting to form said first angle;

each leading flute wall and its corresponding margin surface intersecting to form said second angle;

each said plurality of land structures comprises a land surface;

each leading flute wall and its adjacent land surface intersecting to form a first angle adjacent said tip portion of said drill; and each leading flute wall and its adjacent land surface intersecting to form a second angle at said second portion of each cutting edge structure disposed away from said tip portion of said drill;

said first angle is greater than said second angle.

* * * * *